(12) United States Patent
Clause

(10) Patent No.: US 9,889,874 B1
(45) Date of Patent: *Feb. 13, 2018

(54) THREE-AXIS MOTION JOYSTICK

(71) Applicant: Clause Technology, Allentown, PA (US)

(72) Inventor: Brian Clause, Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/614,872

(22) Filed: Jun. 6, 2017

Related U.S. Application Data

(63) Continuation-in-part of application No. 15/236,708, filed on Aug. 15, 2016, now Pat. No. 9,823,686.

(51) Int. Cl.
| | |
|---|---|
| *B62D 1/12* | (2006.01) |
| *B60W 10/18* | (2012.01) |
| *B60W 30/18* | (2012.01) |
| *B25J 13/02* | (2006.01) |
| *G05G 9/04* | (2006.01) |
| *B60K 26/02* | (2006.01) |
| *G05G 9/047* | (2006.01) |

(52) U.S. Cl.
CPC .............. *B62D 1/12* (2013.01); *B25J 13/02* (2013.01); *B60W 10/18* (2013.01); *B60W 30/18* (2013.01); *G05G 9/04* (2013.01); *B60K 2026/029* (2013.01); *G05G 2009/04714* (2013.01)

(58) Field of Classification Search
CPC . B62D 1/12; G05G 9/04; G05G 9/047; G05G 2009/04714; G05G 9/04737; G05G 2009/04781; G05G 9/04792; G05G 5/03; G05G 1/04; G05G 2009/04766; G05G 2009/04774; B60K 26/02; B60K 2026/029; B60K 26/00; B25J 13/02; Y10T 74/20213; B60W 30/18; B60W 30/18181

USPC .......... 74/471 R, 471 XY, 482; 180/333, 315
See application file for complete search history.

(56) References Cited

U.S. PATENT DOCUMENTS

| | | | | |
|---|---|---|---|---|
| 3,011,739 A | * | 12/1961 | Boyce ..................... | B64C 13/04 244/237 |
| 3,028,126 A | * | 4/1962 | Holleman ............... | B64C 13/04 244/236 |
| 3,117,649 A | * | 1/1964 | Parton ................... | B60W 10/06 180/333 |
| 3,196,709 A | * | 7/1965 | Bickford .................. | B62D 1/14 74/557 |
| 3,299,731 A | * | 1/1967 | Howard, Jr. ............ | B64C 13/04 200/6 A |

(Continued)

*Primary Examiner* — Paul N Dickson
*Assistant Examiner* — Timothy Wilhelm
(74) *Attorney, Agent, or Firm* — Michael J. Feigin, Esq.; Feigin & Fridman LLC

(57) ABSTRACT

A controller having a joystick which can be moved in three dimensions is disclosed. The joystick is connected by a Y (yaw) link which is, in turn, connected to a P (pitch) link, which is, in turn connected to an R (roll) link. The R link is rotatable about a fixed-position mounting base. Alternately, the joystick is connected by an R (roll) link which is, in turn, connected to a P (pitch) link, which is, in turn connected to an Y (yaw) link. The Y link is rotatable about a fixed-position mounting base. In either of these manners, one can rotate a joystick around any of three axes. When used to control a vehicle, rotation around the yaw and roll axes can steer (with one being more fine-tuned steering), and rotation around the pitch axis can control acceleration and deceleration.

15 Claims, 24 Drawing Sheets

(56) References Cited

U.S. PATENT DOCUMENTS

| | | | | |
|---|---|---|---|---|
| 3,312,123 A * | 4/1967 | Rumpf | B62D 1/04 | 280/775 |
| 3,350,956 A * | 11/1967 | Monge | B64C 13/04 | 244/234 |
| 3,388,609 A * | 6/1968 | Miller | G05G 9/047 | 137/636.2 |
| 3,831,633 A * | 8/1974 | Comer | B62D 11/183 | 137/636.2 |
| 3,897,805 A * | 8/1975 | Casey | E02F 3/76 | 137/636.2 |
| 4,027,547 A * | 6/1977 | Rahman | G05G 9/047 | 137/636.2 |
| 4,069,720 A * | 1/1978 | Thor | B64C 13/04 | 244/225 |
| 4,422,345 A * | 12/1983 | Green | G05G 9/047 | 74/471 XY |
| 4,427,084 A * | 1/1984 | Savard, Jr. | B62B 3/12 | 180/19.3 |
| 4,641,849 A * | 2/1987 | De Cortanze | B62D 1/12 | 180/219 |
| 4,667,909 A * | 5/1987 | Curci | B64C 13/12 | 244/234 |
| 4,726,248 A * | 2/1988 | Kawai | B25J 13/02 | 74/471 XY |
| 4,895,039 A * | 1/1990 | Hegg | B64C 13/04 | 180/333 |
| 4,920,820 A * | 5/1990 | Ingham | B62D 1/12 | 74/471 XY |
| 4,976,582 A * | 12/1990 | Clavel | B25J 9/1065 | 108/138 |
| 5,007,300 A * | 4/1991 | Siva | B25J 13/02 | 414/5 |
| 5,019,761 A * | 5/1991 | Kraft | G05B 19/427 | 318/568.1 |
| 5,050,449 A * | 9/1991 | Falcou | G05G 7/04 | 338/128 |
| 5,107,080 A * | 4/1992 | Rosen | B64C 13/04 | 200/6 A |
| 5,116,180 A * | 5/1992 | Fung | B25J 9/1689 | 414/5 |
| 5,182,961 A * | 2/1993 | Menahem | B64C 13/04 | 244/234 |
| 5,379,663 A * | 1/1995 | Hara | B25J 13/02 | 345/161 |
| 5,456,428 A * | 10/1995 | Hegg | B64C 13/12 | 244/229 |
| 5,477,597 A * | 12/1995 | Catania | B21J 15/10 | 29/33 K |
| 5,497,847 A * | 3/1996 | Ota | B60K 20/02 | 180/333 |
| 5,503,040 A * | 4/1996 | Wright | B64C 13/04 | 244/236 |
| 5,587,937 A * | 12/1996 | Massie | B25J 9/1689 | 700/264 |
| 5,655,411 A * | 8/1997 | Avitan | G05G 9/047 | 74/471 XY |
| 5,724,068 A * | 3/1998 | Sanchez | G05G 9/047 | 345/161 |
| 5,755,645 A * | 5/1998 | Miller | A61H 1/0285 | 482/115 |
| 5,769,363 A * | 6/1998 | Griswold | B64C 13/04 | 244/234 |
| 5,805,140 A * | 9/1998 | Rosenberg | G01B 5/008 | 345/156 |
| 5,859,372 A * | 1/1999 | Neltoft | G01L 5/166 | 250/221 |
| 5,979,264 A * | 11/1999 | Rosheim | B25J 17/0266 | 74/490.03 |
| 5,995,893 A * | 11/1999 | Lee | G05G 9/047 | 414/680 |
| 6,059,660 A * | 5/2000 | Takada | G05G 9/047 | 273/148 B |
| 6,222,179 B1 * | 4/2001 | Mikan | G05G 9/047 | 250/221 |
| 6,267,673 B1 * | 7/2001 | Miyamoto | A63F 13/06 | 463/23 |
| 6,293,160 B1 * | 9/2001 | Shigemoto | G01L 1/2231 | 73/862.632 |
| 6,425,205 B2 * | 7/2002 | Wygle | E05F 15/619 | 296/56 |
| 6,437,771 B1 * | 8/2002 | Rosenberg | A63F 13/06 | 345/156 |
| 6,573,885 B1 * | 6/2003 | McVicar | F16D 3/382 | 345/156 |
| 6,642,685 B2 * | 11/2003 | Onodera | G05G 9/047 | 318/568.16 |
| 6,681,880 B2 * | 1/2004 | Bernhardt | G05G 9/047 | 172/442 |
| 6,722,224 B2 * | 4/2004 | Nordstrom | G05G 9/047 | 74/471 XY |
| 6,805,021 B2 * | 10/2004 | Kato | F16H 59/105 | 74/473.12 |
| 6,837,124 B2 * | 1/2005 | Tsai | G05G 9/047 | 188/333 |
| 6,880,855 B2 * | 4/2005 | Chernoff | B60N 2/4693 | 180/315 |
| 6,966,397 B2 * | 11/2005 | Yanaka | B62D 1/12 | 180/315 |
| 7,236,157 B2 * | 6/2007 | Schena | A63F 13/06 | 345/161 |
| 7,320,263 B2 * | 1/2008 | Gustafsson | G05G 5/28 | 74/471 XY |
| 7,466,303 B2 * | 12/2008 | Yi | A61B 5/055 | 345/156 |
| 7,623,945 B2 * | 11/2009 | Kraft | B25J 13/02 | 414/2 |
| 7,675,258 B2 * | 3/2010 | Dattilo | G05G 1/04 | 318/560 |
| 7,701,161 B2 * | 4/2010 | Hanlon | B64C 13/04 | 318/561 |
| 7,726,692 B2 * | 6/2010 | Ozaki | B62D 1/04 | 280/778 |
| 7,783,384 B2 * | 8/2010 | Kraft | B25J 13/02 | 414/2 |
| 7,843,426 B2 * | 11/2010 | Larson | G05G 9/047 | 345/156 |
| 8,087,619 B2 * | 1/2012 | Hanlon | B64C 13/04 | 244/223 |
| 8,096,206 B2 * | 1/2012 | Konig | G05G 9/047 | 74/471 XY |
| 8,100,029 B2 * | 1/2012 | Peterson | G05G 9/047 | 244/234 |
| 8,230,755 B2 * | 7/2012 | Ishikawa | G05G 9/047 | 74/470 |
| 8,235,330 B2 * | 8/2012 | Rozovski | B64C 13/04 | 244/220 |
| 8,371,187 B2 * | 2/2013 | Payandeh | B25J 13/02 | 74/469 |
| 8,667,860 B2 * | 3/2014 | Helmer | B25J 13/02 | 74/490.01 |
| 8,746,103 B2 * | 6/2014 | Apkarian | G05G 7/02 | 74/471 XY |
| 8,770,055 B2 * | 7/2014 | Peterson | B64C 13/04 | 74/471 XY |
| 8,881,616 B2 * | 11/2014 | Dize | G05G 9/047 | 345/161 |
| 9,050,727 B2 * | 6/2015 | Kishi | B25J 3/04 | |
| 9,051,836 B2 * | 6/2015 | Yates | F01D 7/00 | |
| 9,134,187 B1 * | 9/2015 | Organ | G01L 5/223 | |
| 9,575,504 B2 * | 2/2017 | Dize | G05G 9/047 | |
| 2002/0175467 A1 * | 11/2002 | Dicus | B60G 17/033 | 273/148 B |
| 2002/0190948 A1 * | 12/2002 | Coutant | G05G 23/02 | 345/161 |
| 2003/0152452 A1 * | 8/2003 | Hodgson | B60N 2/4693 | 414/694 |
| 2004/0099081 A1 * | 5/2004 | Riwan | B25J 3/04 | 74/490.01 |

(56) References Cited

U.S. PATENT DOCUMENTS

| | | | |
|---|---|---|---|
| 2006/0090588 A1* | 5/2006 | Zumbusch | B62D 1/12 74/543 |
| 2006/0156848 A1* | 7/2006 | Gosselin | B25J 13/02 74/471 XY |
| 2006/0254377 A1* | 11/2006 | Henle | B64C 13/04 74/471 XY |
| 2008/0193260 A1* | 8/2008 | Yokokohji | B25J 13/02 414/1 |
| 2009/0266948 A1* | 10/2009 | Hanlon | G05G 9/047 248/201 |
| 2012/0017714 A1* | 1/2012 | Rinaldi | G05G 9/047 74/471 R |
| 2014/0160015 A1* | 6/2014 | Ogawa | B25J 13/02 345/156 |
| 2015/0060185 A1* | 3/2015 | Feguri | B60T 7/10 180/333 |
| 2015/0090065 A1* | 4/2015 | Kishi | B25J 13/02 74/491 |
| 2017/0050721 A1* | 2/2017 | Voiles | G05G 9/047 |

* cited by examiner

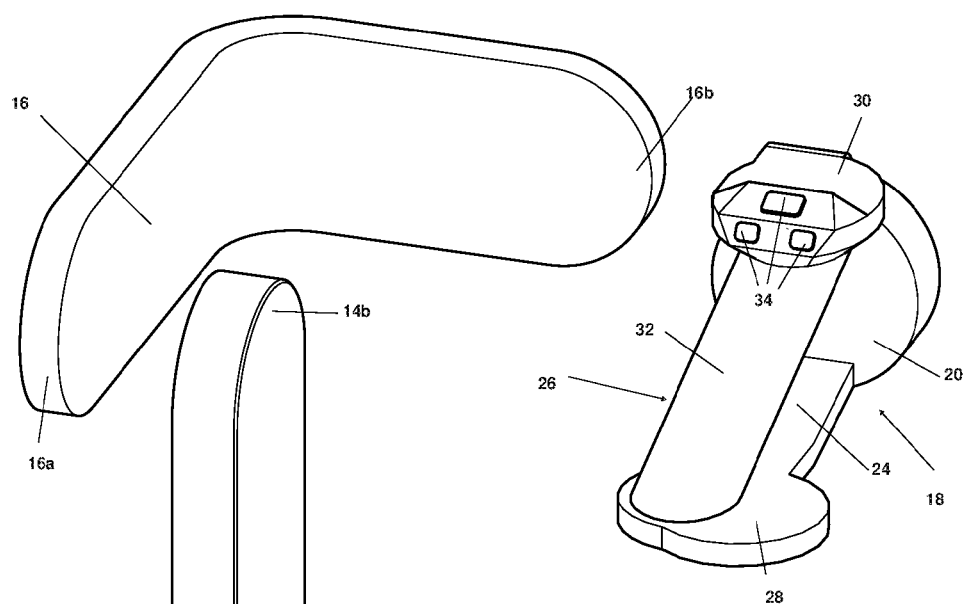
FIG. 2A
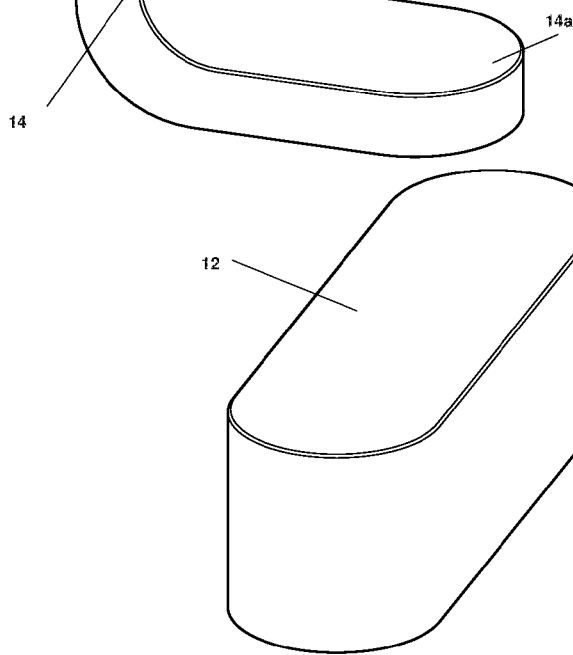

THREE-AXIS MOTION JOYSTICK

FIELD OF THE DISCLOSED TECHNOLOGY

The disclosed technology relates generally to hand-held controllers and, more specifically, to joysticks which move around three wrist axes.

BACKGROUND OF THE DISCLOSED TECHNOLOGY

Conventional automobiles have three primarily hydromechanical actuators: hydraulic steering assist, hydraulic transmission, and hydraulic brakes. This hydraulic machinery is operated by arms moving a steering wheel and legs moving foot pedals. Arms, legs, steering wheel, and foot pedals all have significant inertia, and therefore relatively slow operating times. However, their slow operation is a good speed match for the slow response times of hydraulic steering, transmission, and brakes.

The typical electric vehicle (EV) has three primarily electromechanical actuators: electric power steering, electric motor propulsion, and electric regenerative braking (plus hydraulic brakes as backup). This electric machinery is also operated by arms moving a steering wheel and legs moving foot pedals. However, the slow operation of arms, legs, steering wheel, and foot pedals is a poor speed match for the fast response times of electric steering, propulsion, and braking.

Arms and legs moving a steering wheel and pedals are too cumbersome and slow to fully exploit the responsiveness of an EV's electric machinery. Automobile manufacturers have tried several alternatives, mainly the 2 degrees of freedom (DoF) tilt joystick. A 2 DoF tilt joystick is more nimble and faster to operate than a steering wheel and pedals, but it is not used in EVs because it is still not fast enough, and it has low steering precision.

A 2 DoF tilt joystick can be operated more nimbly than a steering wheel. However, like the steering wheel, it requires significant movement of the driver's entire arm. This is due to its pivot point being located below the driver's wrist. This pivot location simplifies the design and construction of the tilt joystick and makes it a very compact controller, but the required arm movement means it is not much faster than a steering wheel.

A typical steering wheel has a rotational range up to 900 degrees lock to lock—all the way left to all the way right. Using a steering wheel, a driver can turn an automobile through its entire range of steering and still make precise steering adjustments at any steering angle. A 2 DoF tilt joystick's maximum practical tilt range around its pivot point is about 90 degrees in any direction, or one tenth that of a steering wheel. This limited tilt range makes precise steering adjustments with a 2 DoF joystick very difficult to achieve over the entire range of steering. Because of its minimal speed advantage and low precision steering, the 2 DoF tilt joystick is not compelling enough to replace the mature technology of the steering wheel.

While some three degree of freedom joysticks do exist, there is a need in the art for devices which are configured for rapid, precise, and safe driving.

SUMMARY OF THE DISCLOSED TECHNOLOGY

A controller of embodiments of the disclosed technology has a fixed position mounting base and a first flange having a first end and second end at right angles to each other, the first end of the first flange being rotatably connected to the fixed position mounting base. A second flange has a first end and second end at right angles to each other, the first end of the second flange rotatably connected to the second end of the first flange. A U-shaped third flange has a mid-section and first and second ends, the mid-section rotatably connects to the second end of the second flange, and a joystick is formed between the first and second ends of the third flange.

A yaw sensor (defined as a device which measures a degree, amount, or angle rotation of the joystick) measures rotation of the first flange with respect to the fixed position mounting base. A pitch sensor measures rotation of the second flange with respect to the first flange, and a roll sensor measures rotation of the third flange and the joystick with respect to the second flange. The pitch and roll sensors are defined as identical to the yaw sensor, except that they measure pitch and roll, respectively, instead of yaw.

In embodiments of the disclosed technology, the first and second ends of the third flange are substantially perpendicular to the second end of the second flange, and the second end of the first flange and the first end of the second flange are at right angles to each other.

In some embodiments, rotation of the joystick with respect to the second flange causes a vehicle to turn left or right, and rotation of the first flange (e.g., yaw) with respect to the fixed position mounting base causes the vehicle to turn left or right to a lesser degree (e.g., vehicle turning) per degree of rotation than said rotation of said joystick (e.g., roll) with respect to the second flange. In other embodiments, rotation of the first flange with respect to the fixed position mounting base causes the vehicle to turn left or right, and rotation of the joystick with respect to the second flange causes the vehicle to turn left or right to a lesser degree (e.g., vehicle turning) per degree of rotation than said rotation of said first flange with respect to the fixed position mounting base. Rotation of the second flange with respect to the first flange may cause the vehicle to accelerate or decelerate.

In some embodiments, at least one of the first flange, the second flange, the third flange, and the mounting base includes a hollow, and at least one linkage connecting two of the first flange, the second flange, the third flange, and the mounting base, or at least one motor for measuring degree of rotation, is disposed in the hollow.

In a second embodiment, the controller includes a fixed position mounting base and a substantially U-shaped first flange having a mid-region and having a flange extension extending from one end thereof, the mid-region being rotatably connected to the fixed position mounting base. A second flange has a first end and second end, the first end of the second flange and the flange extension of the first flange being rotatably connected. A joystick is rotatably connected to the second end of the second flange.

The mid-region of the first flange is rotatably connected to the fixed position mounting base via a curved rack and pinion mechanism.

In some embodiments, a roll sensor measures rotation of the first flange with respect to the fixed position mounting base, a pitch sensor measures rotation of the second flange with respect to the first flange, and/or a yaw sensor measures rotation of the joystick with respect to the second flange.

In some embodiments, rotation of the first flange with respect to the fixed position mounting base causes a vehicle to turn left or right, and rotation of the joystick with respect to the second flange causes the vehicle to turn left or right to a lesser degree per degree of rotation than the rotation of the first flange with respect to the fixed position mounting base. In other embodiments, rotation of the joystick with respect to the second flange causes a vehicle to turn left or right, and rotation of the first flange with respect to the fixed position mounting base causes the vehicle to turn left or right to a lesser degree per degree of rotation than the rotation of the joystick with respect to the second flange. In some embodiments, rotation of the second flange with respect to the first flange causes the vehicle to accelerate or decelerate.

In some embodiments, at least one torque motor is engaged with a linkage between the first flange and the second flange and provides active force to the second flange. The active force, in embodiments of the disclosed technology, may be zero when the second flange is at a right angle to the first flange and may increase as the second flange moves away from the first/prior right angle to the first flange.

"Substantially" and "substantially shown," for purposes of this specification, are defined as "at least 90%," or as otherwise indicated. "Identical" and "exactly," for purposes of this specification, are defined as "within an acceptable tolerance level known in the art." Any device may "comprise," or "consist of," the devices mentioned here-in, as limited by the claims. Any element described may be one of "exactly" or "substantially," as described.

It should be understood that the use of "and/or" is defined inclusively, such that the term "a and/or b" should be read to include the sets: "a and b," "a or b," "a," or "b."

BRIEF DESCRIPTION OF THE DRAWINGS

FIGS. 2A, 2B, and 2C show blown-apart versions of the controller of FIG. 1, FIGS. 2B and 2C including pancake motors.

DETAILED DESCRIPTION OF EMBODIMENTS OF THE DISCLOSED TECHNOLOGY

Controllers having a joystick which can be moved in three dimensions are disclosed. In one embodiment, the joystick is connected by an R (roll) link (sometimes referred to as a "flange") which is, in turn, connected to a P (pitch) link, which is, in turn connected to a Y (yaw) link. The Y link is rotatable about a fixed-position mounting base. In another embodiment the joystick is connected by a Y (yaw) link which is, in turn, connected to a P (pitch) link, which is, in turn, connected to an R (roll) link. The R link is rotatable about a fixed-position mounting base by a curved rack and pinion mechanism.

In both embodiments, one can rotate a joystick in any of three directions. When used to control a vehicle, rotation around the yaw and roll axes can steer (with either yaw or roll being more fine-tuned steering), and rotation around the pitch axis can control acceleration and deceleration. A starting or center position for each link can be defined, and typically the further a link is rotated from this central position, the more resistance is applied, in embodiments of the disclosed technology.

Embodiments of the disclosed technology will become clearer in view of the forthcoming description of the figures.

Figure 1:
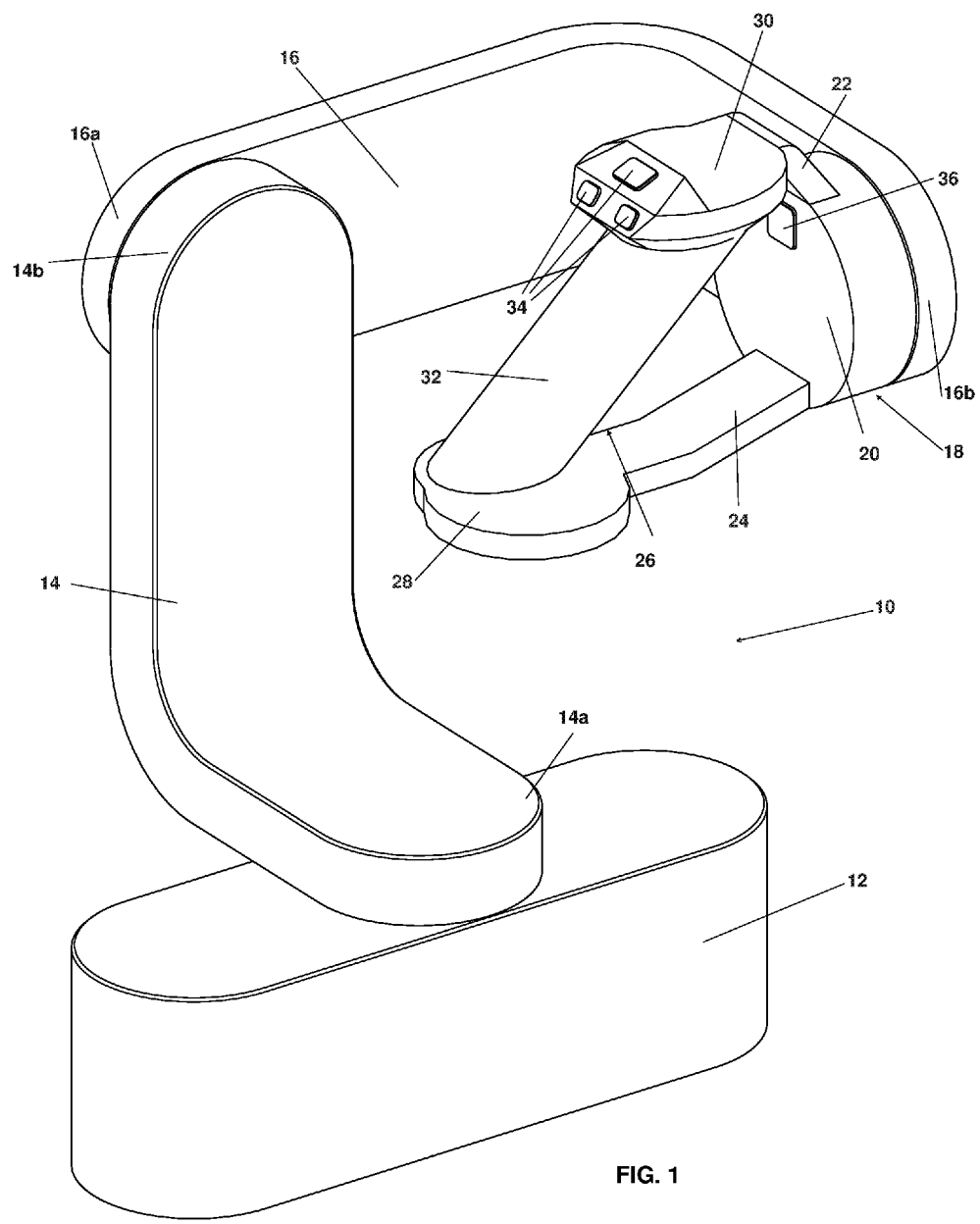
FIG. 1 shows a first controller with three axes of movement in a first resting position, in an embodiment of the disclosed technology.
Figure 2B:
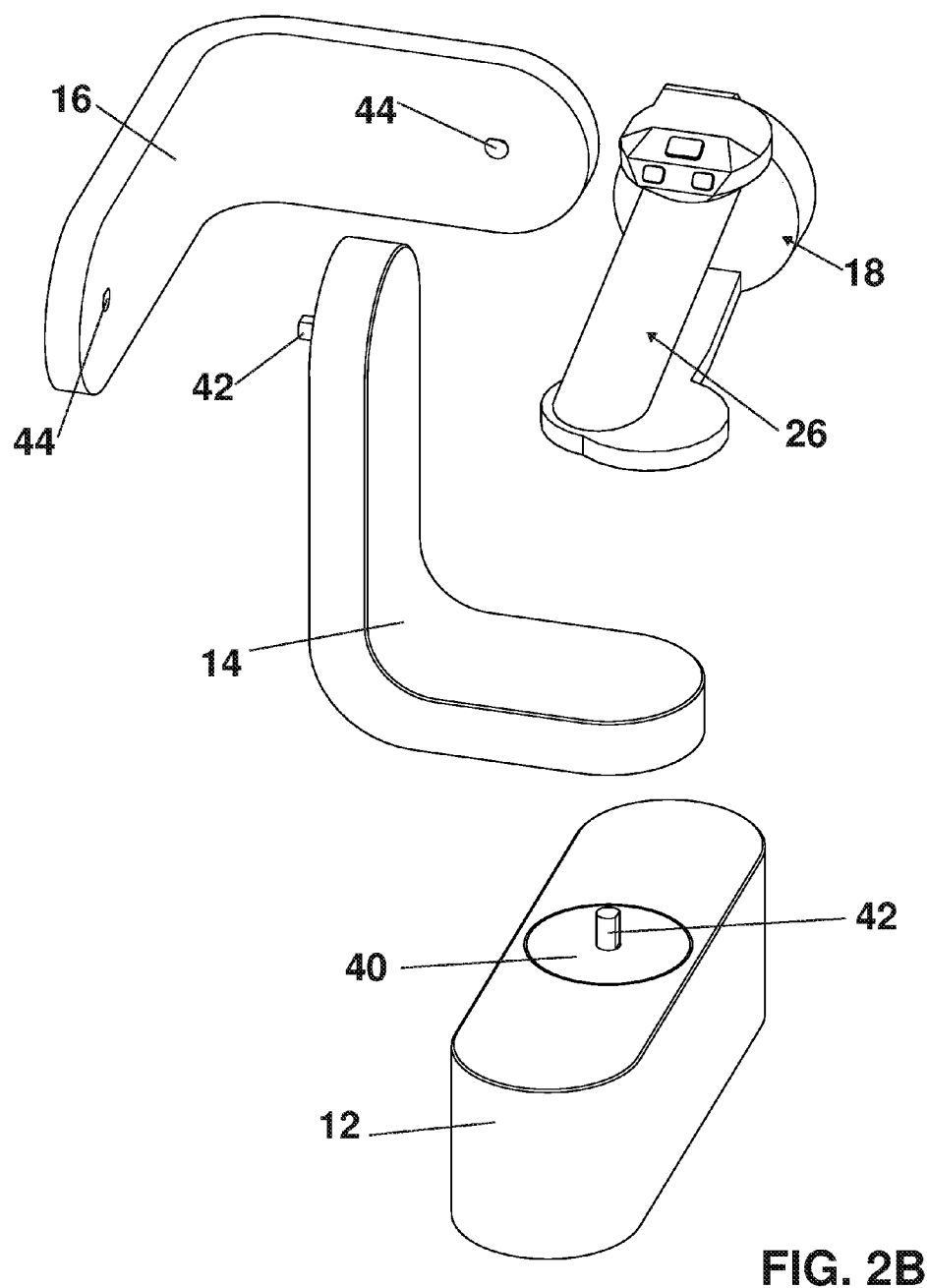
Figure 2C:
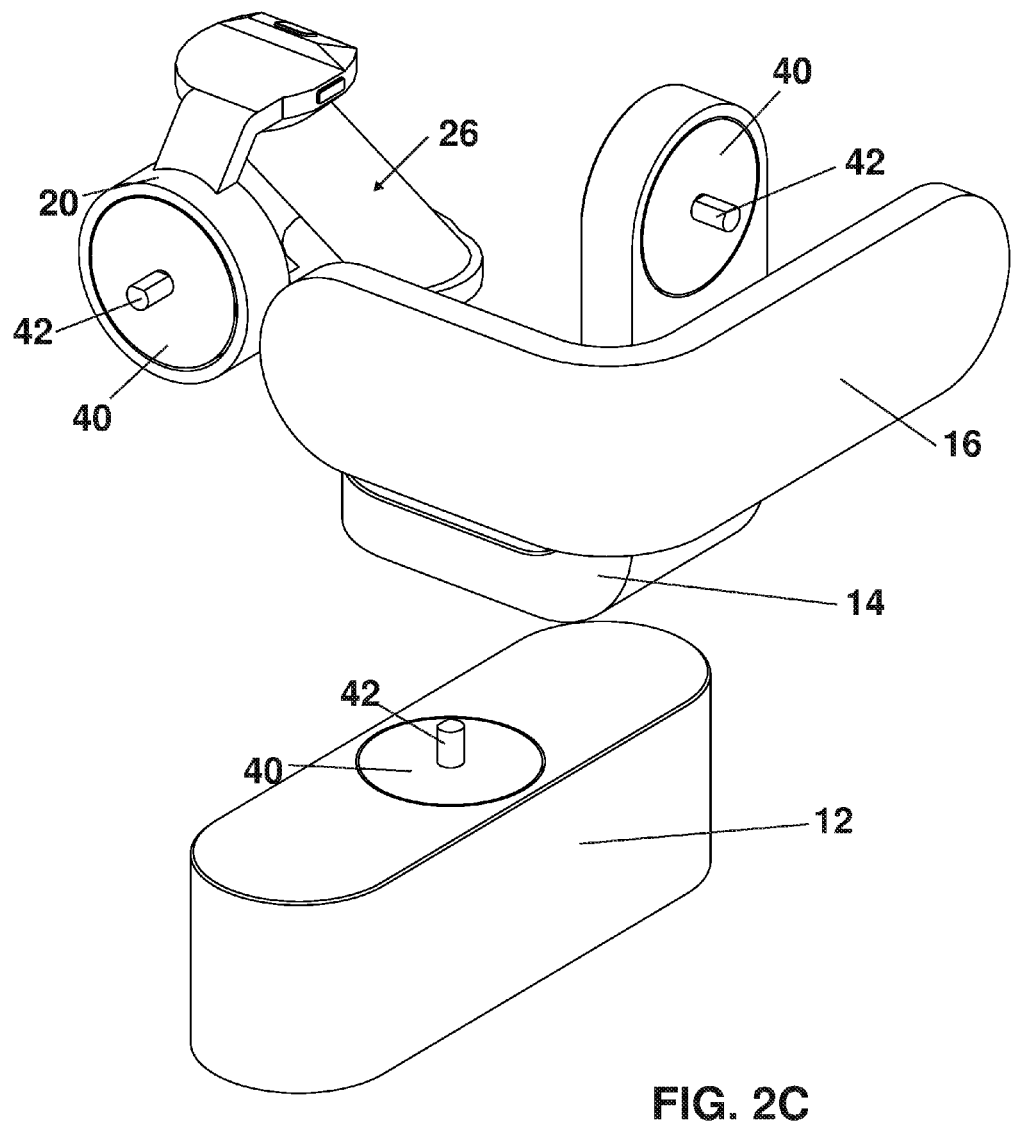

Reference is now made to FIG. 1, which shows a first controller 10 with three axes of movement in a first resting position, in an embodiment of the disclosed technology, and to FIGS. 2A, 2B, and 2C, which show blown-apart versions of the controller of FIG. 1.

As seen in FIG. 1, a mounting base 12 is fixedly mounted, such as to an interior of a car, a table top, or the like. It can be mounted onto a console of a vehicle or fixed to a top surface either temporarily or permanently. For example, when the controller is used for video games, one might clamp the mounting base 12 to a top of a table surface, whereas when used in an electric vehicle, it might be within a console and fixedly connected, such that it stays stationary with respect to a car chassis. Although the mounting base is described as being mounted to a top surface, the orientation of the mounting base may be adapted so that it may be mounted to a side surface, such as the surface of a door, or may include a dashboard mount.

Using a first linkage (not shown), a first flange 14 is rotatably connected to the mounting base 12. A second flange 16 is rotatably connected to the first flange 14 by way of a second linkage (not shown). In the neutral, or resting position, shown in FIG. 1, the first flange 14 is at a right angle relative to the mounting base 12, and the second flange 16 is at a right angle relative to the first flange 14.

As seen clearly in FIG. 2, each of the first and second flanges 14 and 16 is generally L-shaped, and has a first end and a second end having a ninety degree turn therebetween. The first end 14a of first flange 14 has the first linkage passing therethrough, and the second end 14b of first flange 14 as well as the first end 16a of second flange 16 have the second linkage passing therethrough, as shown in FIG. 1.

A third flange 18, which includes a mid-region 20 and first and second ends 22 and 24, is rotatably connected to the mid-region 20 to the second flange 16 via a third linkage (not shown). A joystick 26 extends between first and second ends 22 and 24, and is rotatable together with third flange 18 relative to second flange 16. The joystick can have a wider base 28 connected to second end 24 of the third flange 18 and a wider top region 30 connected to first end 22 of the third flange 18. The first and second ends 22 and 24 of third flange 18 are generally perpendicular to the mid-region 18, and to the second flange 16, in the illustrated resting position. An elongated length of the joystick 26 (the most elongated length or length desired to be perpendicular to a forearm of a person holding the joystick/passes through a clasped hand there-around) is angled between the first and second ends 22 and 24.

In some embodiments, the third flange 18 and/or the joystick 26 includes pushbuttons for secondary controls. For example, in the illustrated embodiment, joystick 26 includes, on top region 30 thereof, a plurality of pushbuttons 34, and the mid-region 20 of third flange 18 includes a pushbutton 36. The pushbuttons may control the horn, left and right turn signals, high beam headlights, and/or initiating and deactivating autopilot. However, it is appreciated that such secondary controls may be provided anywhere on controller 10, and using any suitable interface, and need not necessarily be pushbuttons or be on the third flange or joystick.

The first, second, and third linkages, rotatably connect two elements together such that many rotations back and forth can take place while the rotatable connection between the two elements linked, remain rotatably connected. The first and third linkages allow for 360 degrees of rotation around a single axis, whereas the maximum rotation of the second linkage (linkage of the P-link) may be less than 360 degrees, due to interference from the other links. The first, second, and third linkages can be any sort of elongated fastening mechanism such as a dowel, screw, or motor axle.

Note that the first, second, and third linkages are, in at least one configuration, perpendicular to one another. The joystick 26 is above the mounting piece 12 when every flange is centered. As such, the joystick 26 is in a position to be moved around any of three axes, causing the corresponding flange to rotate with respect to the element to which it is rotatably connected. This will be shown/discussed with reference to FIGS. 3-9 below.

The first flange 14 is also referred to herein as a "Y link", the second flange 16 as a "P link," and the third flange 18 as an "R link." Each link can rotate with respect to the link to which it is connected, or with respect to the mounting base 12. In embodiments, each link can only rotate with respect to a link to which it is connected. Thus, the Y link 14 can rotate with respect to the mounting base 12 in a manner which constitutes "yaw." The P link 16 can rotate with respect to the Y link in a manner which constitutes "pitch," and the R link 18 can rotate with respect to the P link in a manner which constitutes "roll". Any combinations of changes of roll, pitch, and yaw are possible, though typically limited by the rotation of the forearm and/or wrist of the user of the controller.

In some embodiments, sensors for measuring the degree of rotation of flanges 14, 16, and 18 may be provided at the first, second, and third linkage points. In some embodiments, the flanges 14, 16, and 18 may be hollow, at least in the region of the linkage points thereof. In such embodiments, sensors, motors, and wiring thereof may be enclosed within the flanges, forming an exostructural arrangement. In some embodiments, the motors may include any one or more of a direct drive motor, a pancake motor, and a limited angle torque motor. FIGS. 2B and 2C illustrate a specific embodiment in which each of mounting base 12 and flanges 14 and 18 includes a pancake motor 40 disposed within the flange adjacent to or surrounding the corresponding linkage. In the context of the present specification and claims, the term "pancake motor" relates to a motor having a printed armature with windings shaped as a disc. Each pancake motor 40 has extending therefrom an axle 42, adapted to fit into a corresponding bore 44 in a corresponding one of flanges 14 or 16, thereby to form the first, second, and third linkages.

Figure 3:
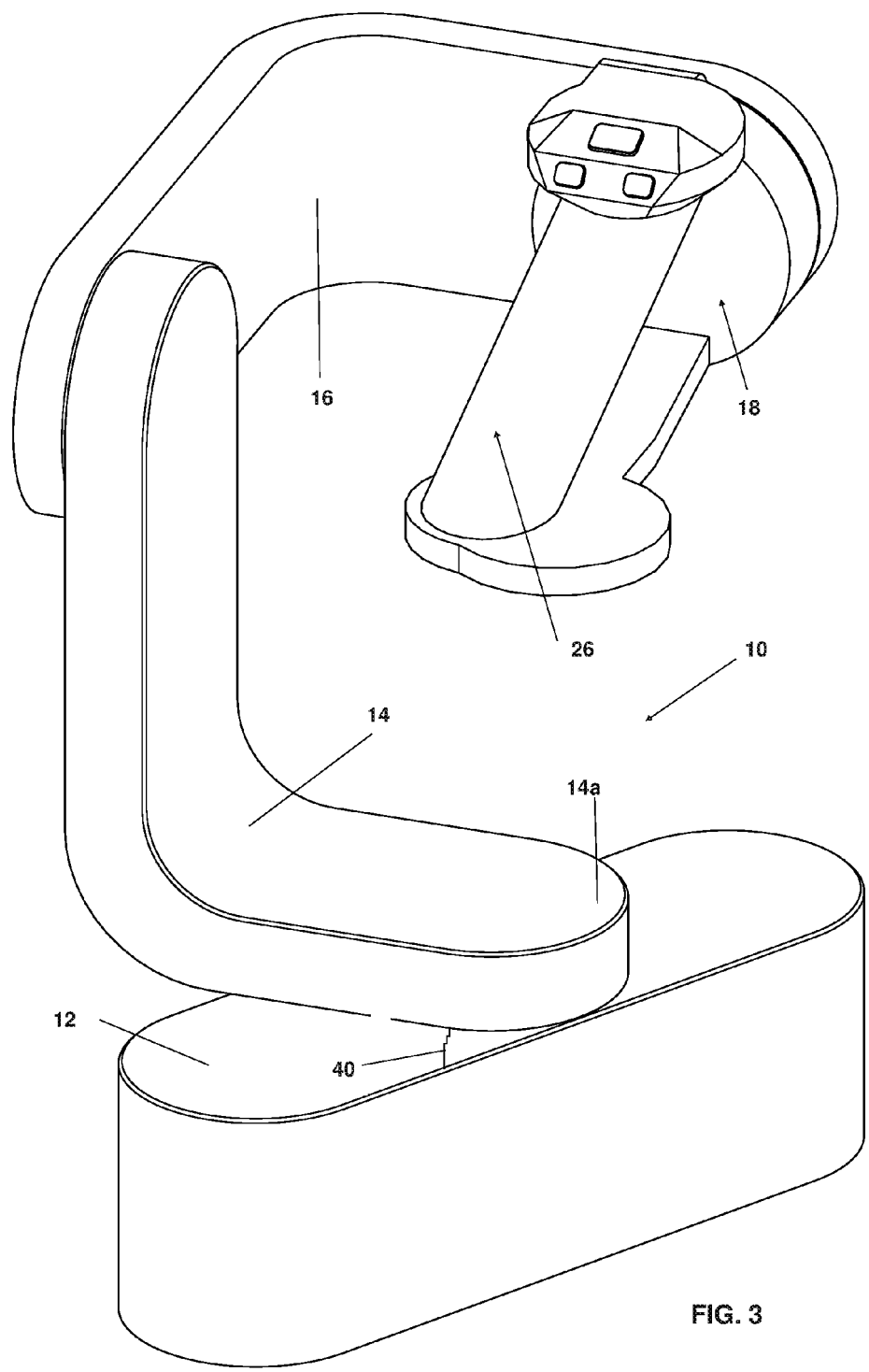
FIG. 3 shows the controller of FIG. 1 rotated around the yaw axis.

FIG. 3 shows the controller 10 of FIG. 1 with rotation around the yaw axis. This is accomplished by rotation of the first flange 14 relative to the mounting base 12, while the relationship between the first flange 14 and the second flange 16 remains unchanged. In the illustrated orientation, the Y link is pulled back, such that an acute angle, indicated by reference numeral 40 is defined between an edge of the mounting base 12 and the first end 14a of the Y link (first flange 14). The rotation of the Y-link with respect to mounting base 12 causes a change in yaw which can be recorded by a suitable sensor, for example measuring rotation at the first linkage point.

Figure 4:
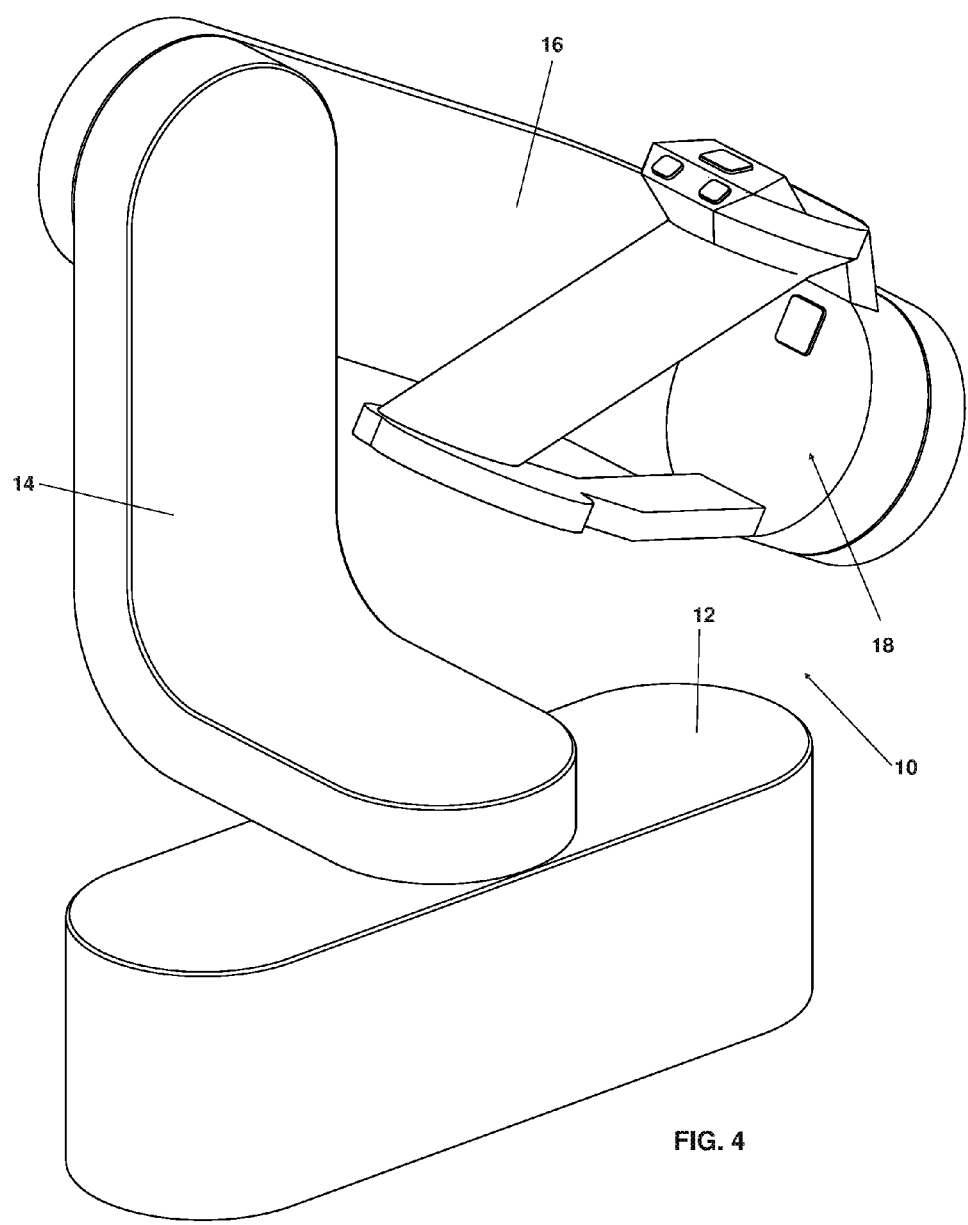
FIG. 4 shows the controller of FIG. 1 rotated around the pitch axis.

FIG. 4 shows the controller of FIG. 1 with rotation around the pitch axis. This is accomplished by rotation of the second flange 16 relative to the first flange 14, while the relationship between the first flange 14 and the mounting base 12, and the relationship between the second flange 16 and the third flange 18, remain unchanged. In the illustrated orientation, the P link is rotated downward, such that a distance between the P link and the mounting base 12 is decreased relative to the resting position shown in FIG. 1. The rotation of the P-link with respect to first flange 14 causes a change in pitch which can be recorded by a suitable sensor, for example measuring rotation at the second linkage point.

Figure 5:
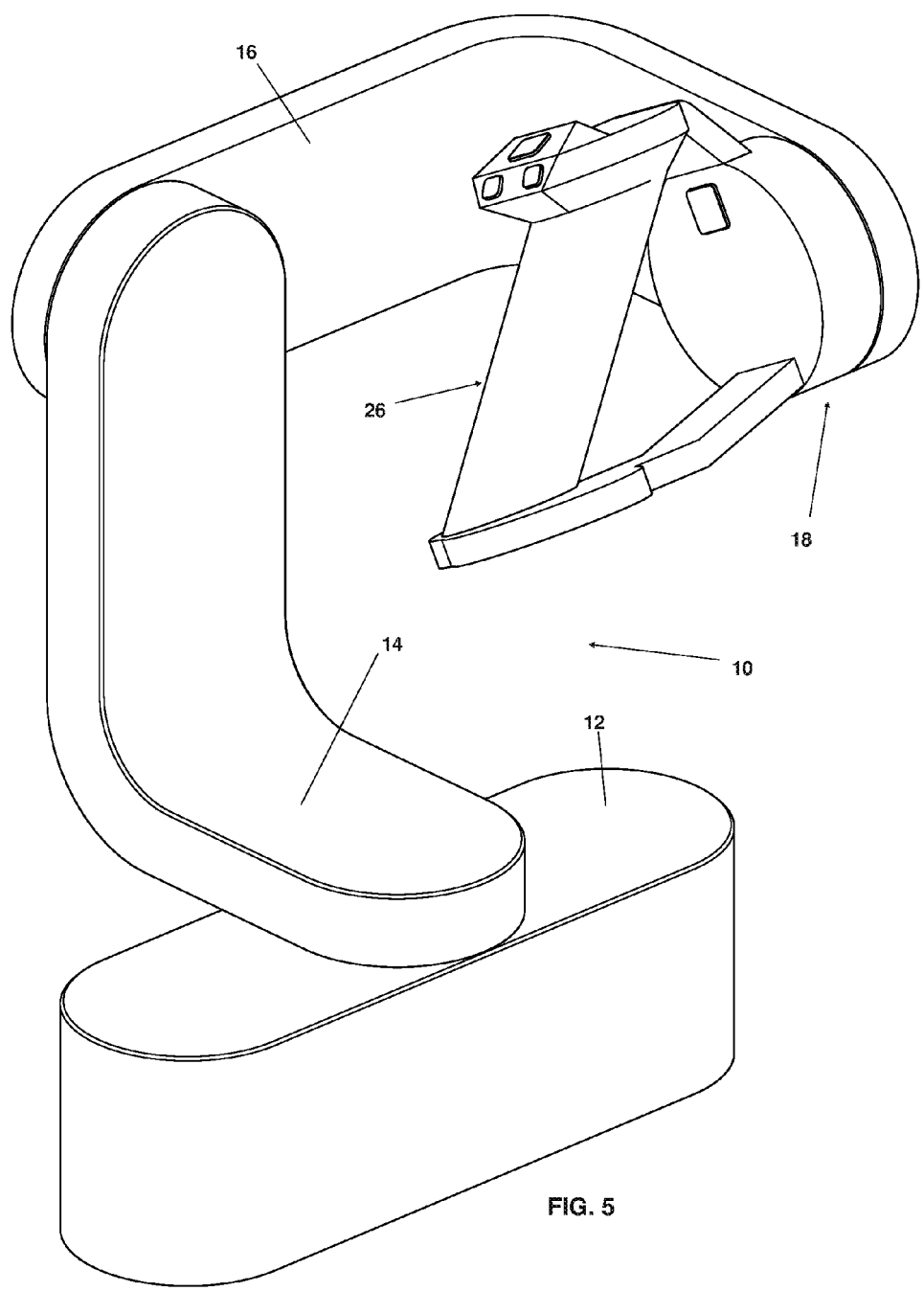
FIG. 5 shows the controller of FIG. 1 rotated around the roll axis.

FIG. 5 shows the controller of FIG. 1 with rotation around the roll axis. This is accomplished by rotation of the third flange 18 and the joystick 26 relative to the second flange 16, while the relationship between the first flange 14 and the mounting base 12, and the relationship between the first flange 14 and the second flange 16, remain unchanged. In the illustrated orientation, the R link is rotated counterclockwise. The rotation of the R-link with respect to second flange 16 causes a change in roll which can be recorded by a suitable sensor, for example measuring rotation at the third linkage point.

Figure 6:
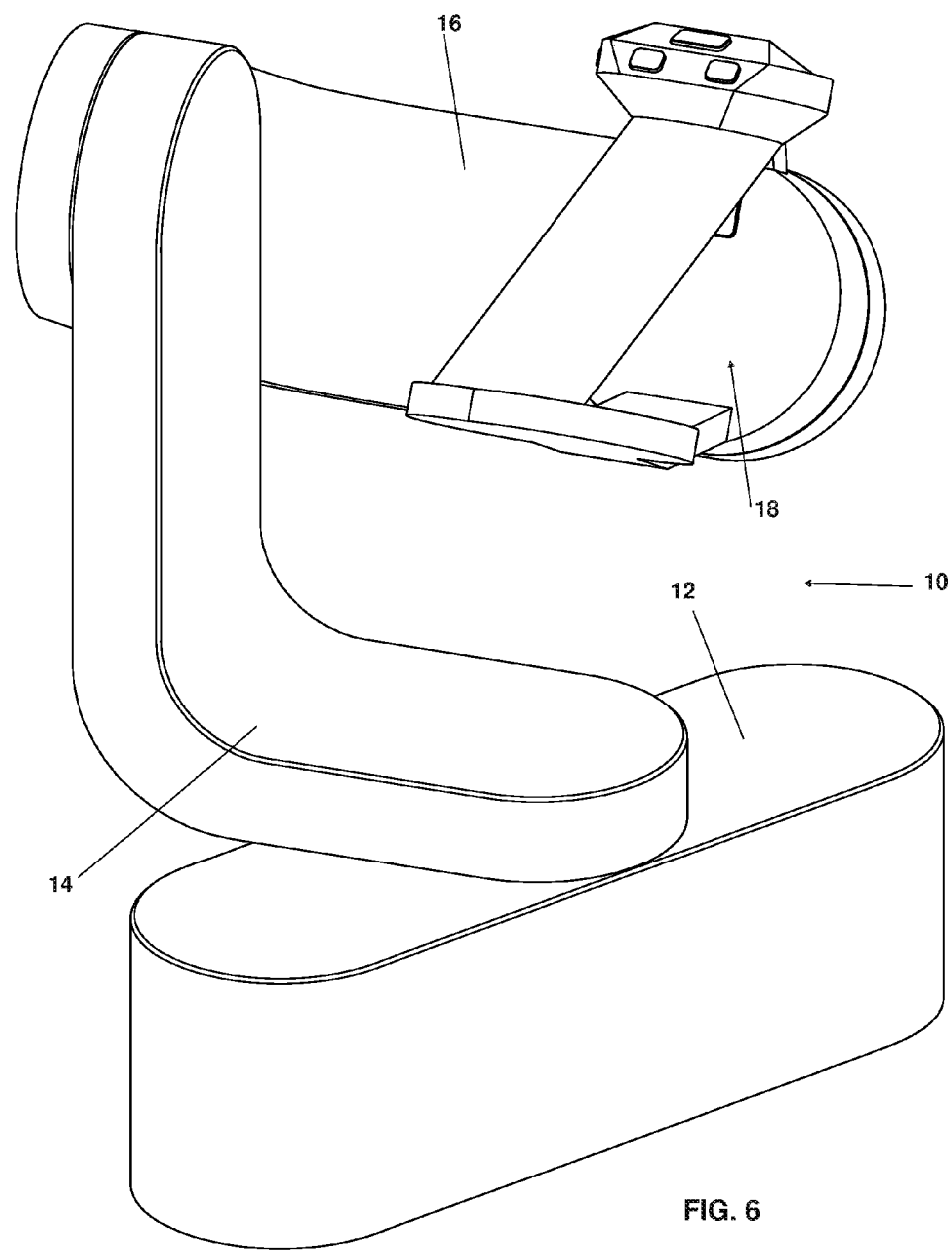
FIG. 6 shows the controller of FIG. 1 rotated around the yaw and pitch axes.

Reference is now made to FIG. 6, which shows the controller 10 of FIG. 1 with rotations around the yaw and pitch axes. As seen in FIG. 6, in addition to the rotation described with reference to FIG. 3 around the yaw axis, rotation of the second flange 16 (P-link) with respect to first flange 14 (Y-link) takes place around the second linkage, as described hereinabove with reference to FIG. 4.

Figure 7:
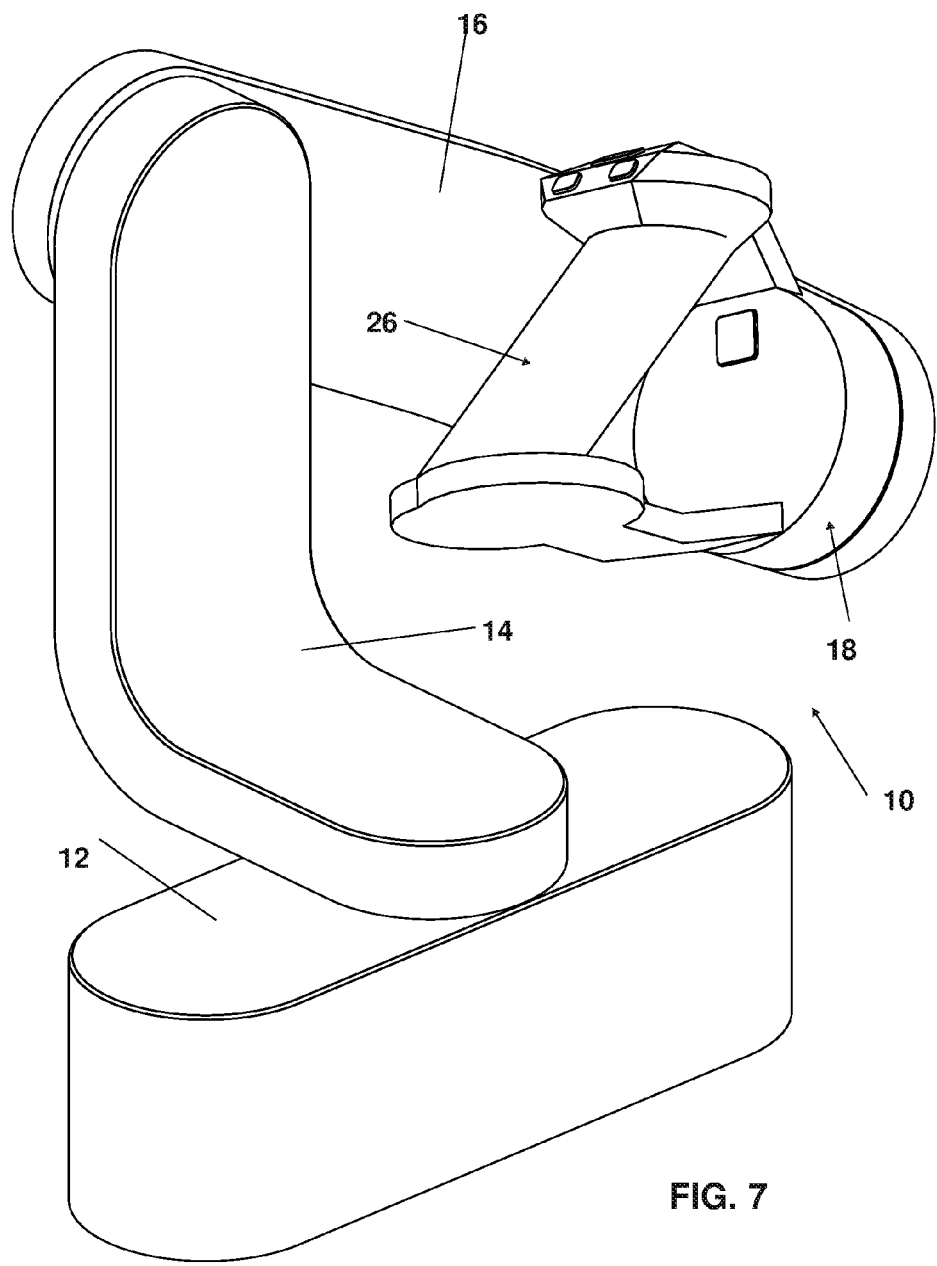
FIG. 7 shows the controller of FIG. 1 rotated around the pitch and roll axes.

FIG. 7 shows the controller 10 of FIG. 1 with rotations around the pitch and roll axes. Here, the combination of rotating the third flange 18 and the joystick 26 with respect to the second flange 16, and rotating the second flange 16 with respect to the first flange 14 (rotation of the R link and P link), causes a change in roll and pitch simultaneously.

Figure 8A:
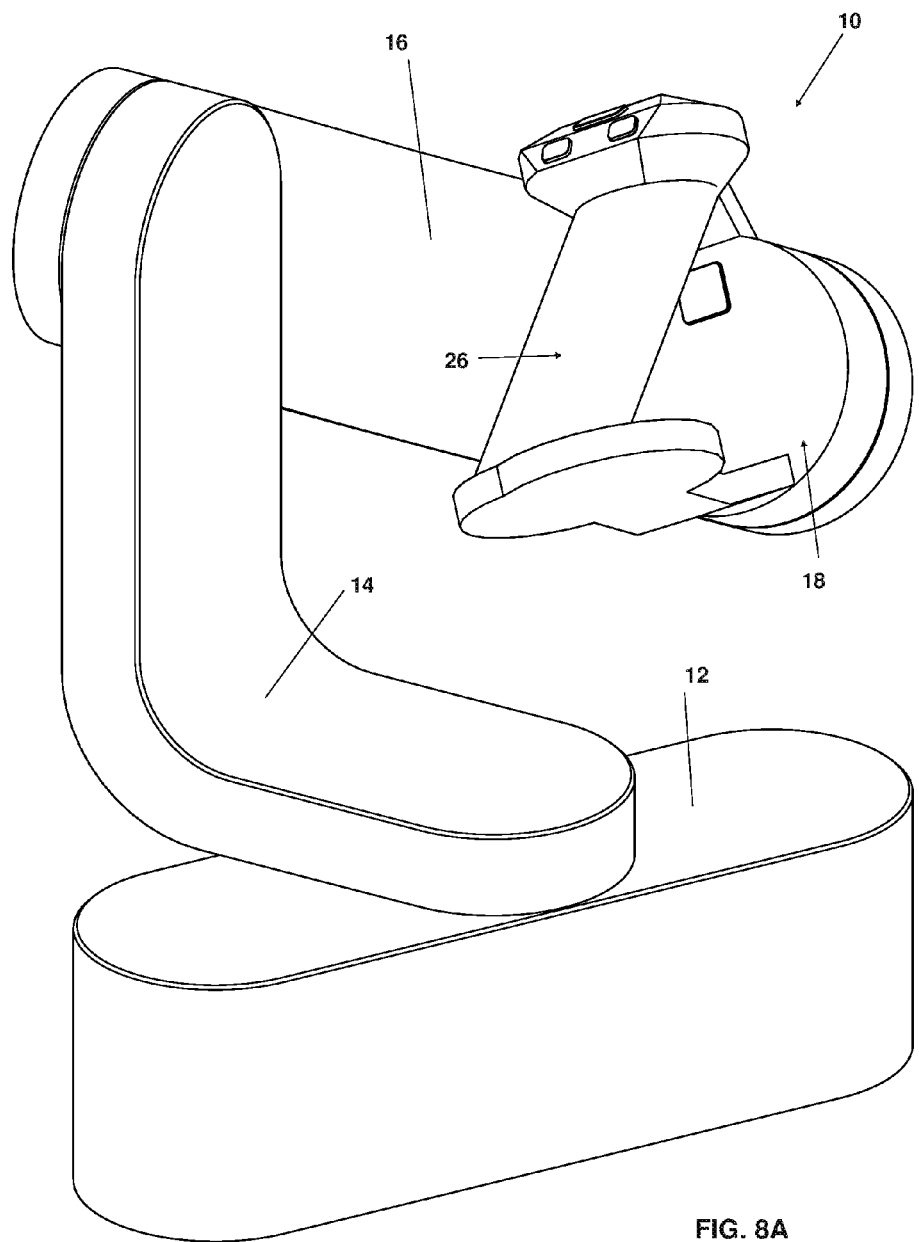
FIGS. 8A and 8B show the controller of FIG. 1 rotated around the yaw, pitch, and roll axes, in three different extent and direction combinations.
Figure 8B:
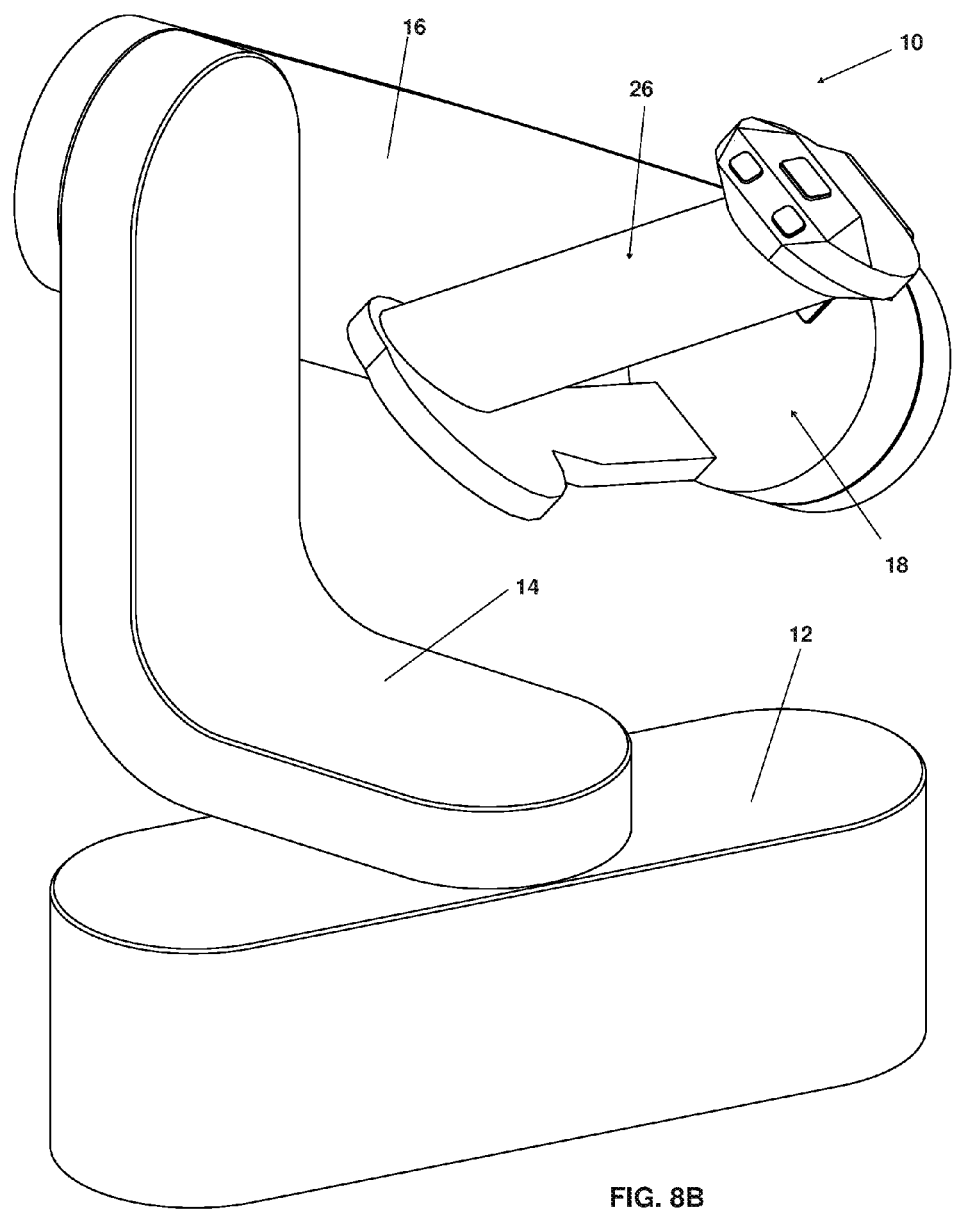

FIGS. 8A and 8B show the controller of FIG. 1 with rotations around the yaw, pitch, and roll axes. Here, each element which can be rotated with respect to another, in an embodiment of the disclosed technology, is so rotated. In FIGS. 8A and 8B, the Y-link (flange 14) is rotated back, similarly to the rotation shown in FIG. 3, and the P-link (flange 16) is rotated downward, similarly to the rotation shown in FIG. 4. In FIG. 8A, the R-link (flange 18 and joystick 26) is rotated counterclockwise, whereas in FIG. 8B the R-link is rotated clockwise, to a greater angular degree of rotation than that shown in FIG. 8A.

Rotation of the R link (flange 18 and joystick 26 with respect to the second flange 16) can be used to steer a vehicle left or right. Rotation of the P link (second flange 16 with respect to first flange 14) can be used for acceleration and deceleration of a vehicle. Rotation of the Y link (first flange 14 with respect to mounting base 12) can be used for fine control of steering, such that, per degree of rotation, steering has less magnitude for rotation of the Y link compared to rotation of the R link. In some embodiments, the assignment of the Y-link and the R-link may be reversed, such that rotation of the Y-link is used to steer the vehicle left or right and rotation of the R-link is used for fine control of steering.

Figure 9:
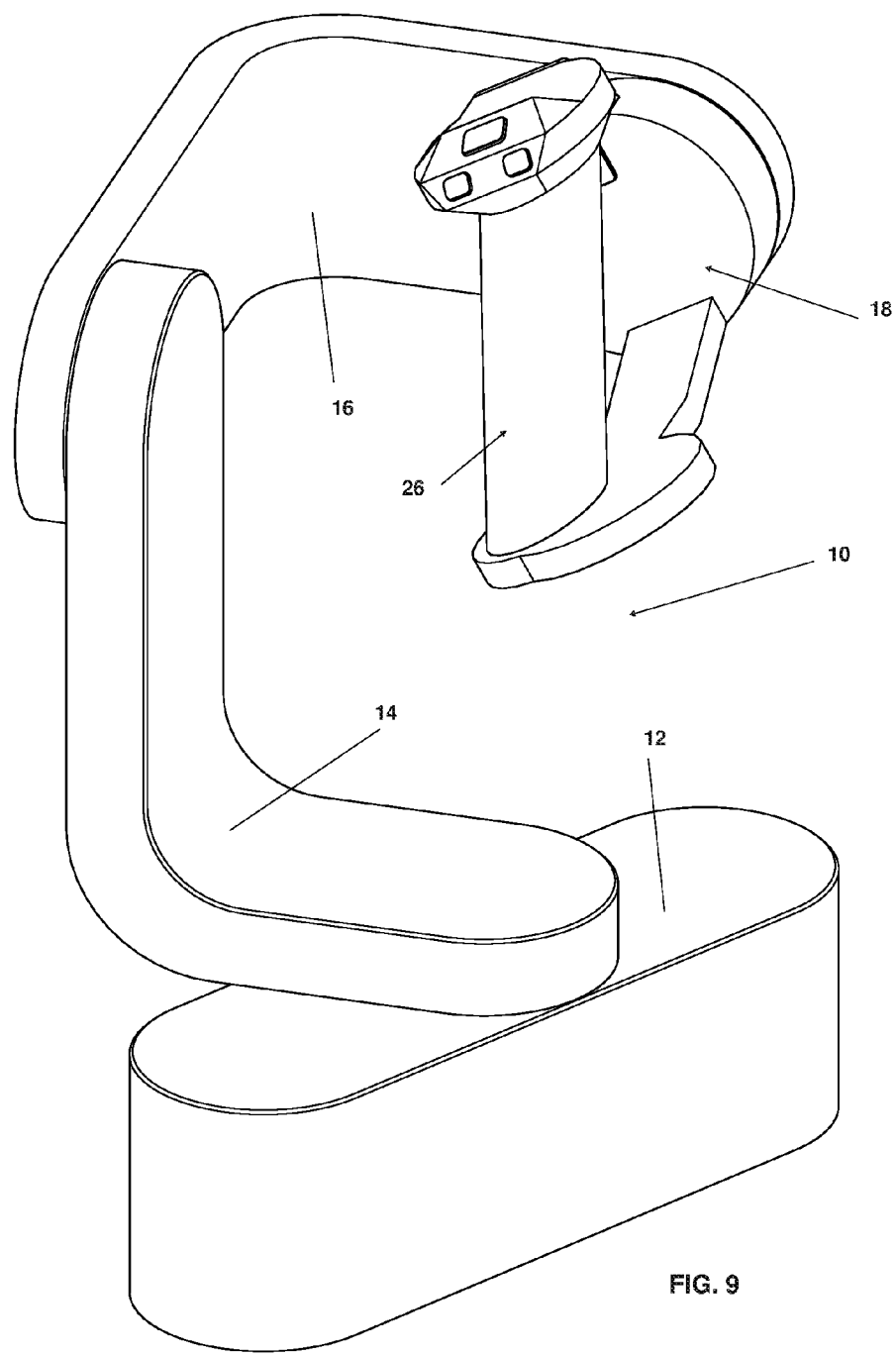
FIG. 9 shows the controller of FIG. 1 rotated around the yaw and roll axes.

FIG. 9 shows the controller 10 of FIG. 1 with rotations around the yaw and roll axes. Here, the pitch remains constant, compared to FIG. 1 (first flange 14 and second flange 16 remain at a 90 degree angle with respect to one another). However, the yaw is changed (the angle between the first flange 14 and the mounting base 12 is acute, and changes relative to the angle shown in FIG. 1) as well as the roll (third flange 18 and joystick 26 are rotated counter-clockwise with respect to the second flange 16).

Controller 10 illustrated in FIGS. 1 to 9 is a controller suited for right handed use. An equivalent controller suited for left handed use would be a mirror image of the illustrated controller, and is considered within the scope of the present invention.

Figure 10A:
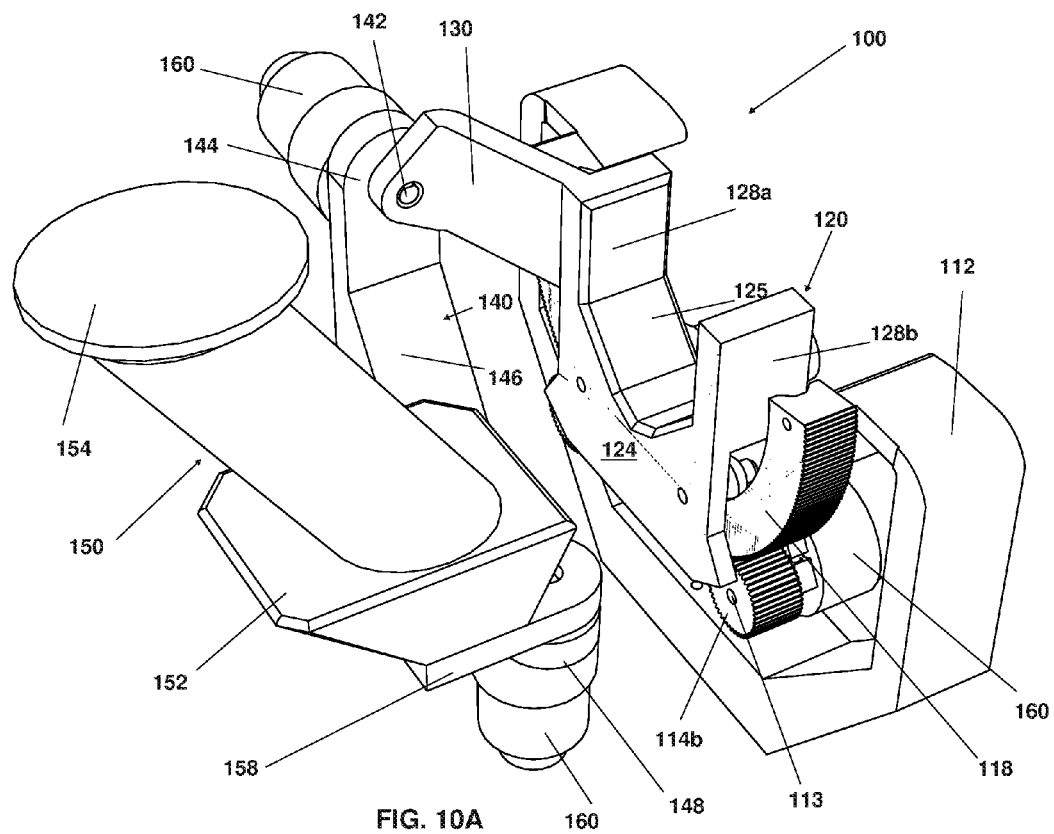
FIGS. 10A and 10B show two perspective angles of a second controller with three axes of movement in a first resting position, in an embodiment of the disclosed technology.
Figure 10B:
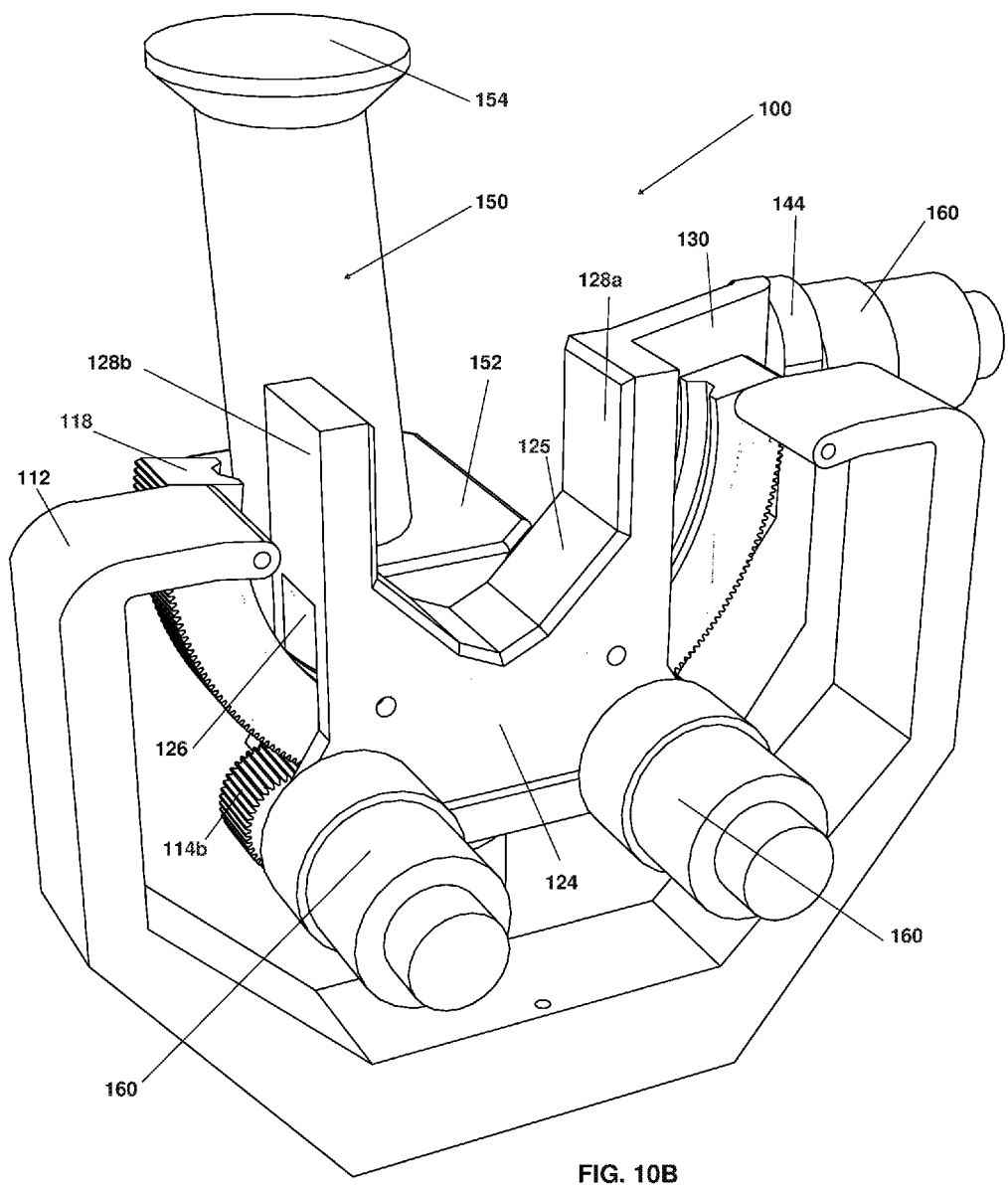
Figure 11:
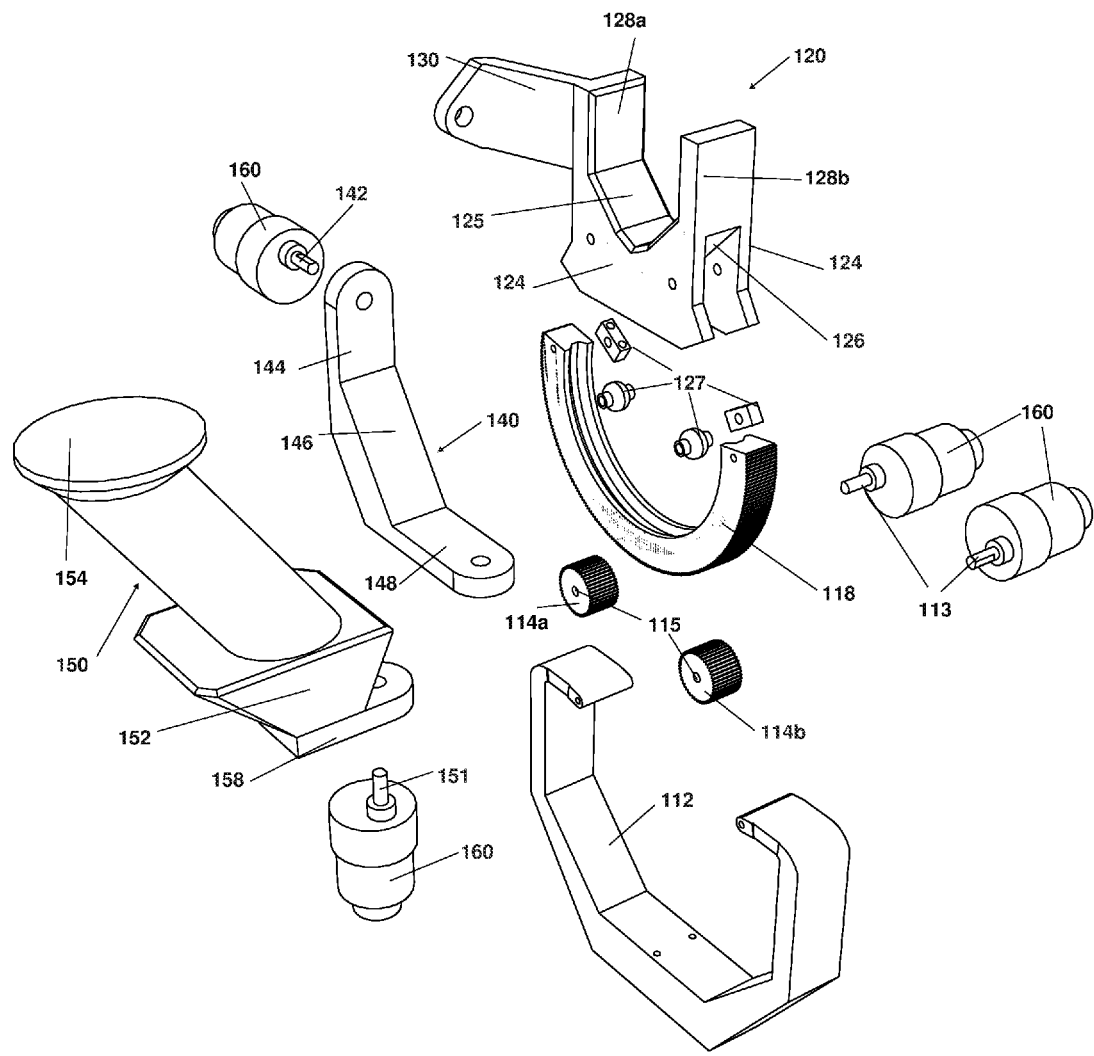
FIG. 11 shows a blown-apart version of the controller of FIGS. 10A and 10B.

Reference is now made to FIGS. 10A and 10B, which show two perspective angles of a second controller 100 with three axes of movement in a first resting position, in an embodiment of the disclosed technology, and to FIG. 11, which shows a blown-apart version of the controller of FIGS. 10A and 10B.

As seen in FIGS. 10A and 10B, a generally U-shaped mounting base 112 is fixedly mounted, such as to an interior of a car, a table, or the like. It can be mounted onto a console of a vehicle or fixed to a top surface either temporarily or permanently. For example, when the controller is used for video games, one might clamp the mounting base 112 to a top surface of a table, whereas when used in an electric vehicle, it might be within a console and fixedly connected, such that it stays stationary with respect to a car chassis. Although the mounting base is described as being mounted to a top surface, the orientation of the mounting base may be adapted so that it may be mounted to a side surface, such as the surface of a door, or may include a dashboard mount.

Using two motor axles 113, a pair of gears, or pinions, 114a and 114b, are mounted to the motor axles 113, and can move relative to the curved rack 118. A generally U-shaped rack 118 is disposed above pinions 114a and 114b and in geared engagement therewith, such that rack 118 is fixed with respect to the mounting base 112, and pinions 114a and 114b are movable with respect to the rack 118 and to the mounting base 112.

A first flange 120 is supported above rack 118, for example by a plurality of rollers 127, and is movable relative to the rack 118 and to the mounting base 112. Flange 120 includes a main body, also known as a wrist cradle, including front and back surfaces 124 connected by a generally U-shaped upper surface 125. The surfaces 124 and 125 together define a channel 126 having a generally U-shaped cross-section and accommodating rack 118, such that front and back surface 124 extend along sides of the rack 118, and are slidable relative thereto. A pair of side walls 128a and 128b extend upwards from upper surface 125 at opposing sides thereof. Extending from side wall 128a is a flange extension 130, which forms an obtuse angle with front surface 124 of the flange.

The first flange 120 is rotatable, or movable, relative to the rack 118 and to the mounting base 112, by operation of the curved rack and pinion mechanism formed by pinions 114a and 114b and rack 118.

A second flange 140 is rotatably connected to flange extension 130 of the first flange 120 by way of a second axle 142. As clearly seen in FIG. 11, in some embodiments, flange 140 includes a first end portion 144 having a portal therethrough for axle 142, a mid-region 146 disposed at a 45 degree angle to the first end portion 144, and a second end portion 148 including a portal for an additional linkage. The second end portion 148 is disposed at a 45 degree angle to the mid-region 146 and at a 90 degree angle to the first end portion 144. Thus, an "end" of flange 140 is a portion which connects to another item and is defined by a furthest end of the flange until a bend in the flange, the bend occurring after a portal or a linkage passing there-through, such that the linkage is between the furthest end and bend.

A joystick 150 is rotatably connected to second end 148 of the second flange 140 via an axle 151. The joystick can have a wider base 152, a wider top region 154, and a linking section 158. The linking section 158 has, in some embodiments, a portal through which axle 151 passes to connect the joystick 150 and base 152 to the second end 148 of the second flange 140. The joystick can rotate about the axle 151. The elongated length of the joystick 150 (the most elongated length or length desired to be perpendicular to a forearm of a person holding the joystick/passes through a clasped hand there-around) is angled at an acute angle, relative to base 152.

In the neutral, or resting position, shown in FIGS. 10A and 10B, the first flange 120 is centered with respect to rack 118, and rack 118 is centered between pinions 114a and 114b, such that a center point of the rack 118 is equidistant from each of the pinions. The first end 144 of the second flange 140 forms an acute angle with flange extension 130, such that a side wall of the second flange is generally parallel to front surface 124 of first flange 120. The linking section 158 of the joystick 150 and the second end 148 of second flange 140 form a right angle relative to one another.

The axles 113, 142, and 151, rotatably connect two elements together such that many rotations back and forth can take place while the rotatable connection between the two elements linked, remain rotatably connected. The linkages can be any sort of elongated fastening mechanism such as a dowel, screw, or motor axle.

Note that the axles 113, 142, and 151 are, in at least one configuration, perpendicular to one another. In the resting position, the joystick 150 is in a position to be moved around any of three axes, causing the corresponding flange to rotate with respect to the element to which it is rotatably connected. This will be shown/discussed with reference to FIGS. 12-18 below.

The first flange 120 is also referred to herein as a "R link", the second flange 140 as a "P link," and the linking section 158, as a "Y link." Each link can rotate with respect to the link to which it is connected, or with respect to the mounting base 112. In embodiments, each link can only rotate with respect to a link to which it is connected. Thus, the R link 120 can rotate with respect to the mounting base 112 in a manner which constitutes "roll". The P link 140 can rotate with respect to the R link in a manner which constitutes "pitch," and the Y link 158 can rotate with respect to the P link in a manner which constitutes "yaw". Any combinations of changes of roll, pitch, and yaw are possible, though typically limited by the rotation of the forearm and/or wrist of the user of the controller.

In the embodiment of FIGS. 10A to 11, there is a plurality of motors 160 which introduce torque when the first axles 113, second axle 142, or third axle 151 are rotated with respect to another element. In some embodiments, the greater the offset from the angle of the resting position, the greater the torque. This prevents excess movement and can simulate torque one would feel when, for example, moving steering wheels left and right. In some embodiment, the motors 160 connected to axles 113 generate force on the pinions 114 and rotate the first pinions 114 and first flange 120 relative to the rack 118 and mounting base 112.

In some embodiments, position encoders or other position measuring elements are disposed at linkages 113, 142, and/or 151, and may be used to measure turning angle of the elongated member associated therewith, and thus, the angle of turn of two elements with respect to one another.

Figure 12:
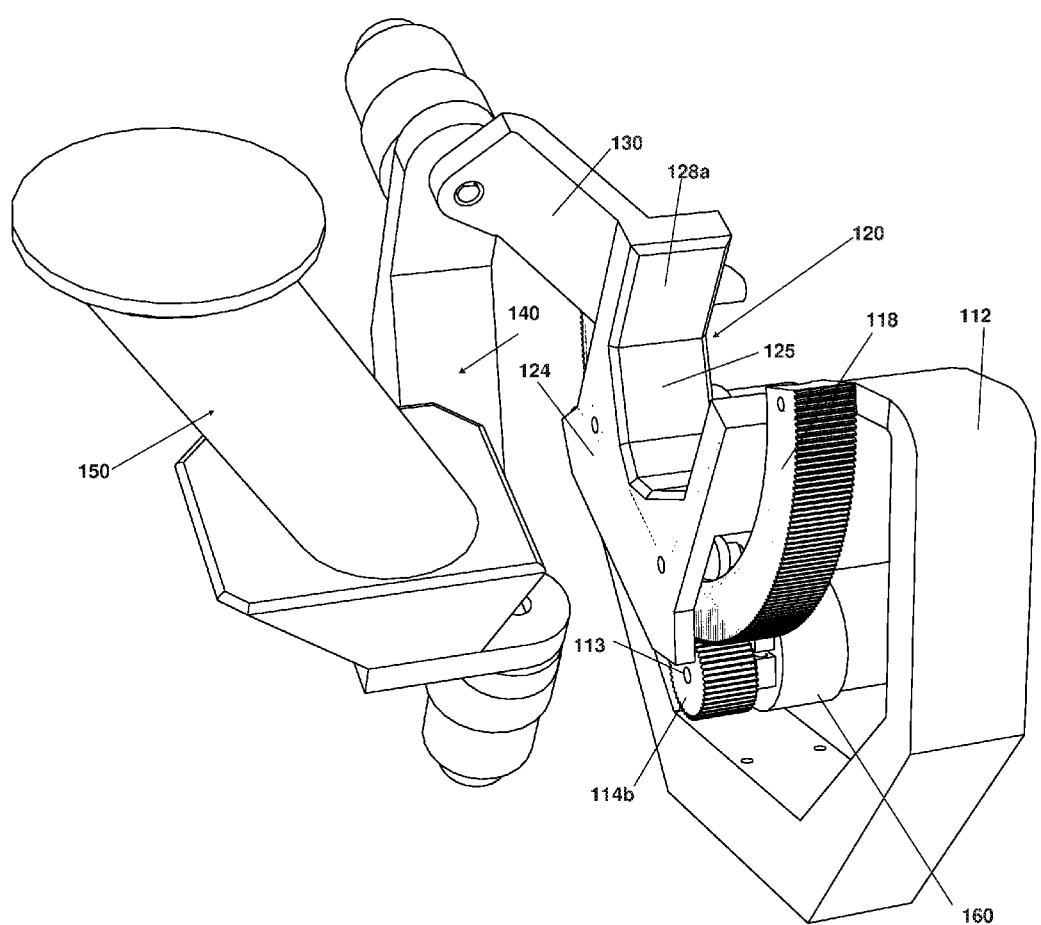
FIG. 12 shows the controller of FIGS. 10A and 10B rotated around the roll axis.

FIG. 12 shows the controller 100 of FIGS. 10A and 10B with rotation around the roll axis. This is accomplished by movement of first flange 120 relative to the mounting base 112 and rack 118 using the rack and pinion mechanism formed by rack 118 and pinions 114a and 114b. As seen in FIG. 12, first flange 120 and pinions 114 have rotated such that a center of rack 118 is disposed above pinion 114b, whereas the first flange 120 has moved along the rack 118 in the opposing direction, toward pinion 114a. At the same time, the relationship between the flange extension 130 of first flange 120 and the second flange 140 remains unchanged. The rotation of the R-link with respect to mounting base 112 causes a change in roll which can be recorded by a suitable sensor, such as elements 160 associated with linkages 113 and measuring rotation thereat.

Figure 13:
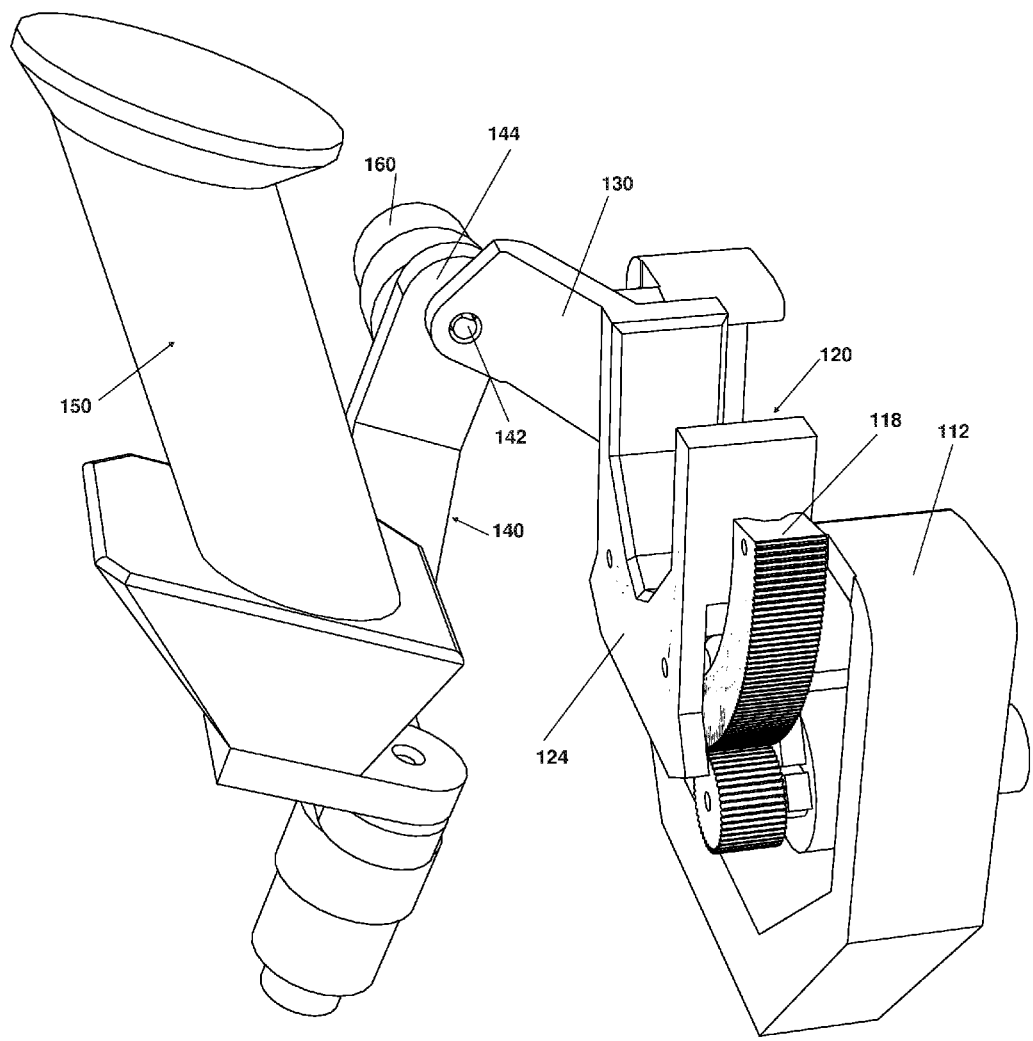
FIG. 13 shows the controller of FIGS. 10A and 10B rotated around the pitch axis.

FIG. 13 shows the controller 100 of FIGS. 10A and 10B with rotation around the pitch axis. This is accomplished by rotation of the second flange 140 relative to the first flange 120, while the relationship between the first flange 120 and the mounting base 112, and the relationship between the second flange 140 and the linking section 158 of joystick 150, remain unchanged. In the illustrated orientation, the P link is rotated outward, such that an angle between the first end 144 of the second flange 140 and the flange extension 130 increases relative to the resting position shown in FIG. 10A, and such that a side surface of second flange 140 is no longer parallel with surface 124 of flange 120 but rather at an acute angle thereto. The rotation of the P-link with respect to first flange 120 causes a change in pitch which can be recorded by a suitable sensor, such as element 160 disposed adjacent to linkage 142 and measuring rotation thereat.

Figure 14:
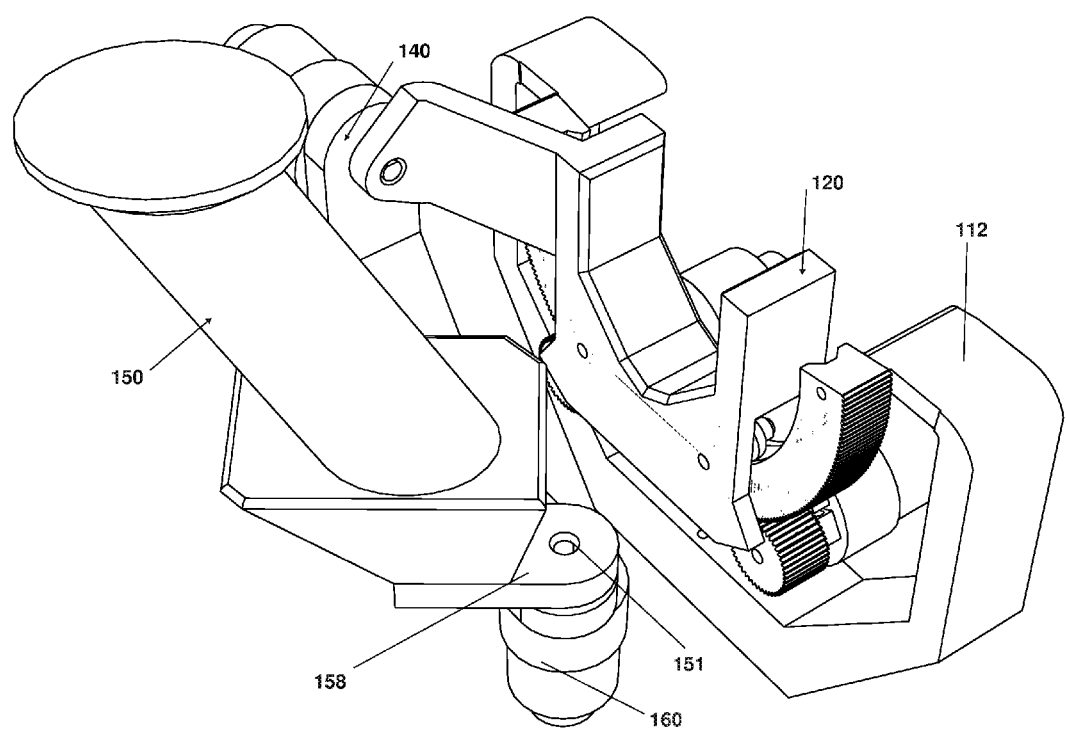
FIG. 14 shows the controller of FIGS. 10A and 10B rotated around the yaw axis.

FIG. 14 shows the controller 100 of FIGS. 10A and 10B with rotation around the yaw axis. This is accomplished by rotating joystick 150 relative to the second flange 140, while the relationship between the first flange 120 and the mounting base 112, and the relationship between the first flange 120 and the second flange 140, remain unchanged. In the illustrated orientation, the Y link is rotated clockwise, when looking at the controller from above. Measurement of this angle of change (yaw) can be made within, or at, the linkage 151.

Figure 15:
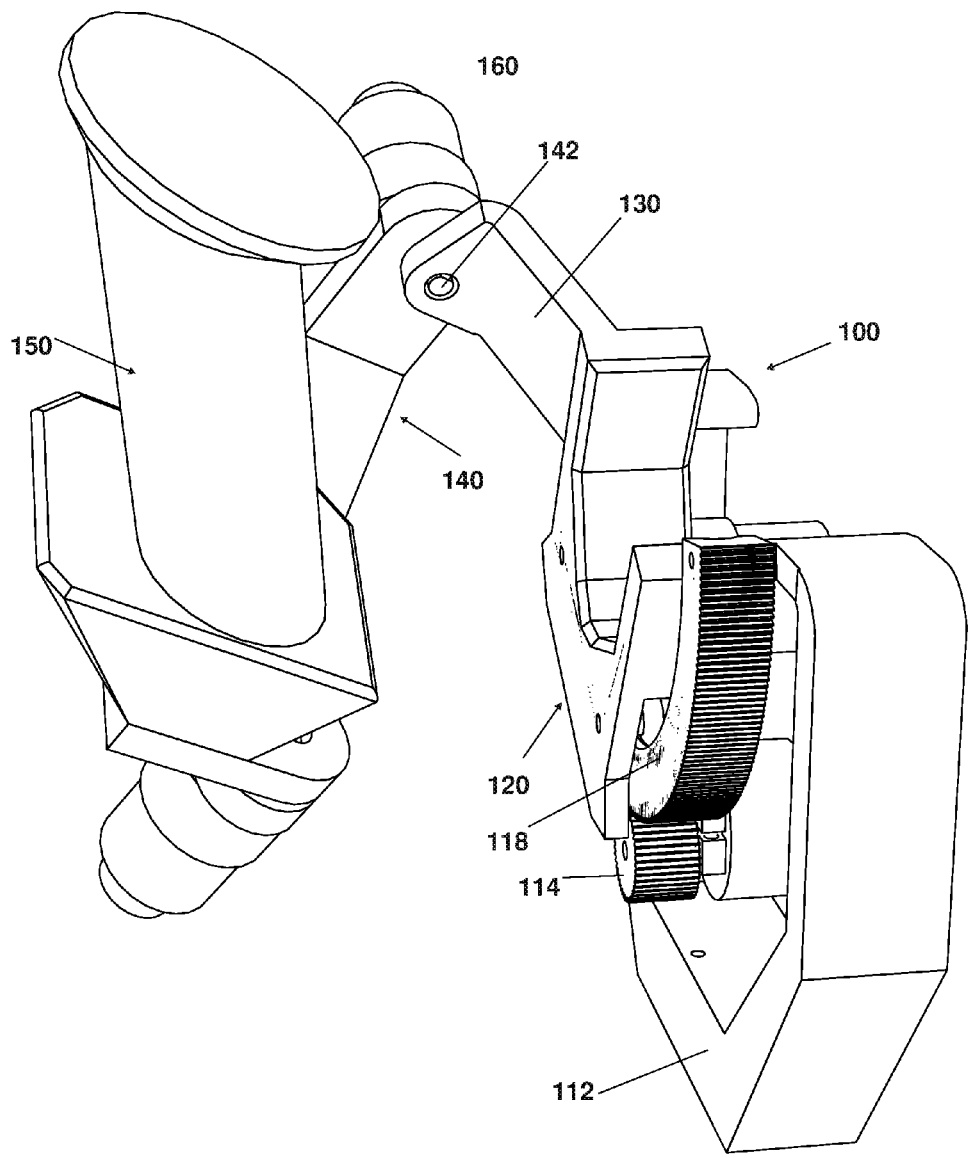
FIG. 15 shows the controller of FIGS. 10A and 10B rotated around the roll and pitch axes.

Reference is now made to FIG. 15, which shows the controller 100 of FIGS. 10A and 10B with rotations around the roll and pitch axes. As seen in FIG. 15, in addition to the rotation described with reference to FIG. 12 around the roll axis, rotation of the second flange 140 (P-link) with respect to first flange 120 (R-link) takes place around the second linkage 142, as described hereinabove with reference to FIG. 13.

Figure 16:
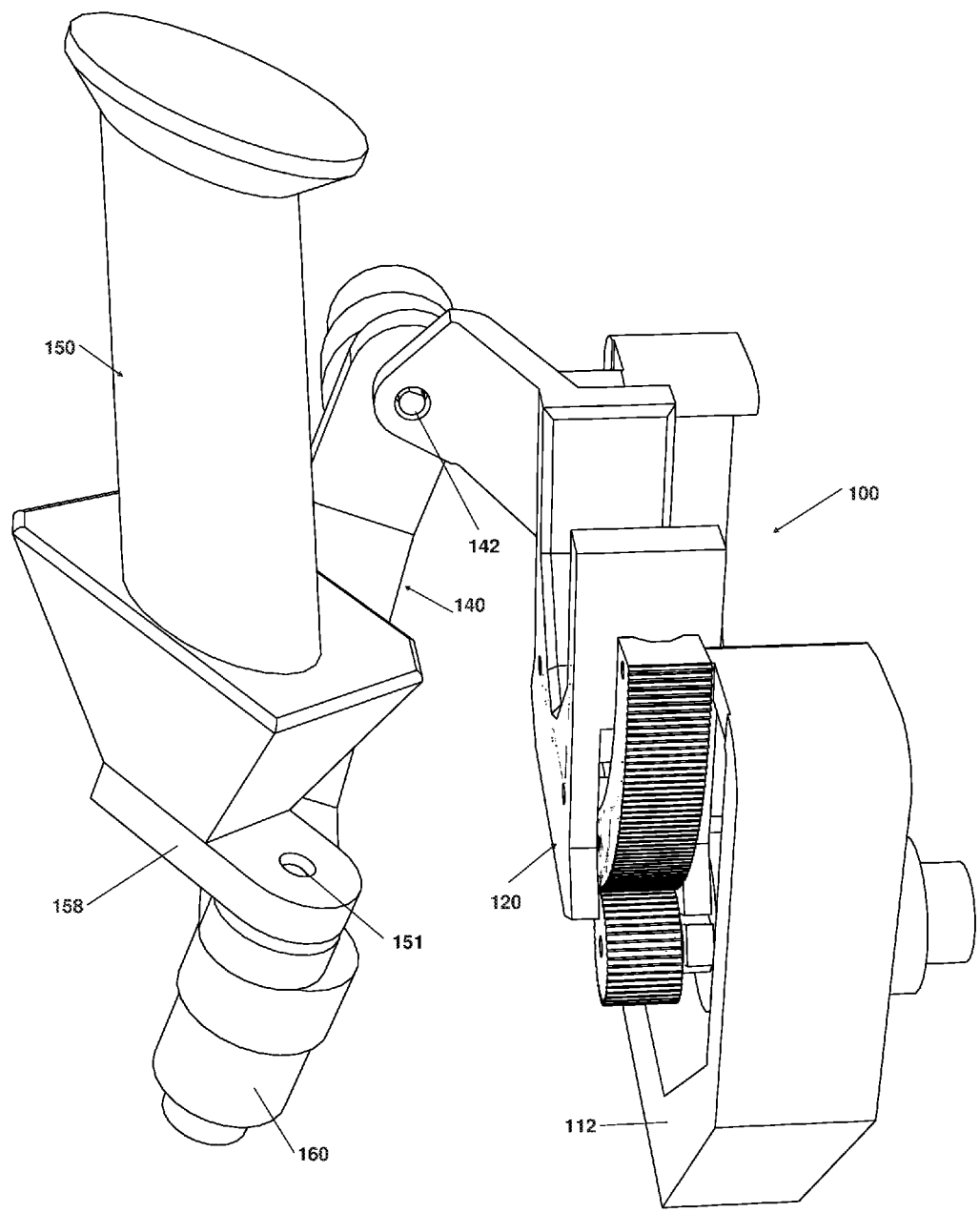
FIG. 16 shows the controller of FIGS. 10A and 10B rotated around the pitch and yaw axes.

FIG. 16 shows the controller 100 of FIGS. 10A and 10B with rotations around the pitch and yaw axes. Here, the combination of rotating the joystick 150 with respect to the second flange 140, and rotating the second flange 140 with respect the first flange 120 (rotation of the Y link and P link), causes a change in yaw and pitch simultaneously.

Figure 17A:
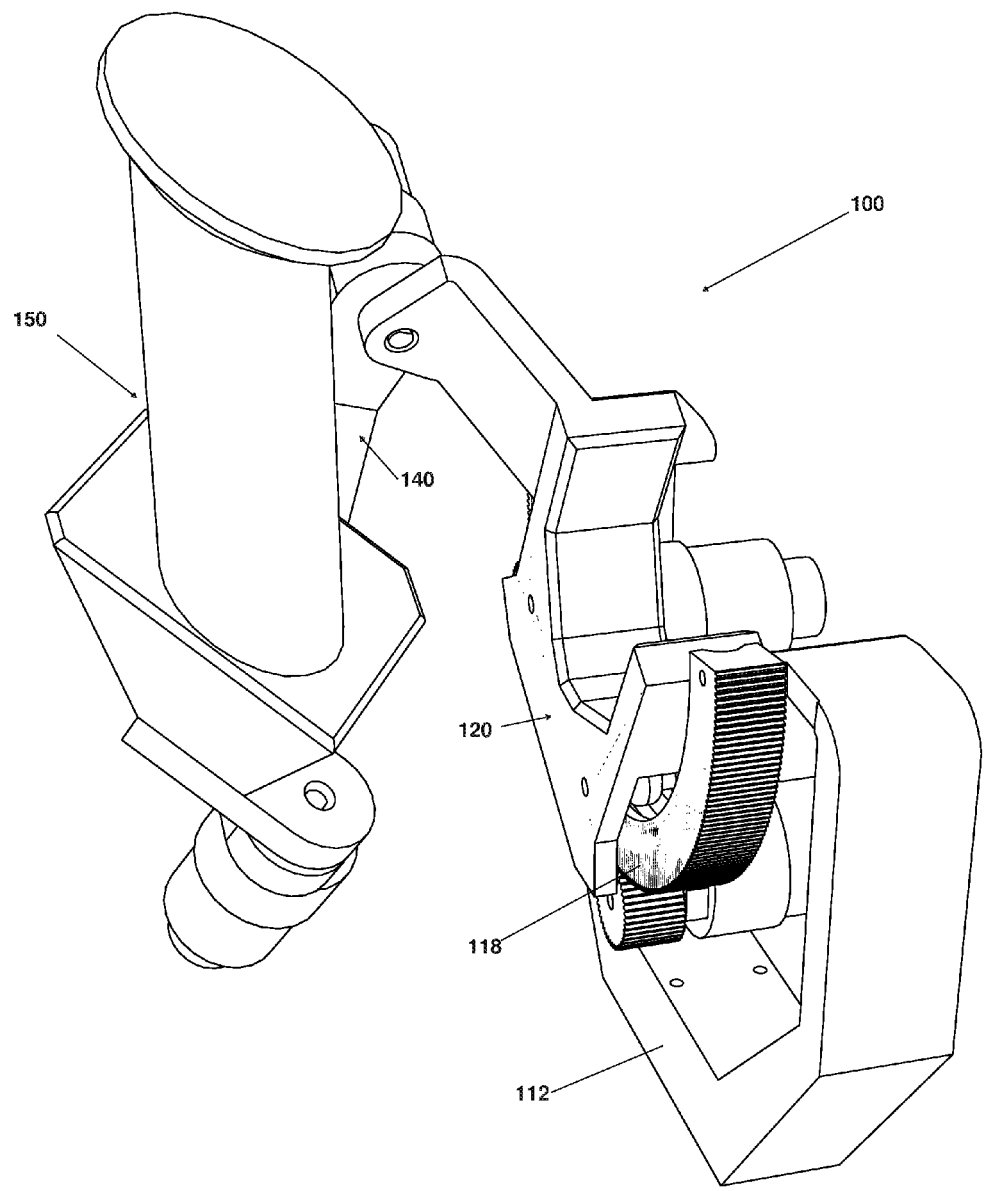
FIGS. 17A, 17B, and 17C show the controller of FIGS. 10A and 10B rotated around the yaw, pitch, and roll axes, in three different extent and direction combinations.
Figure 17B:
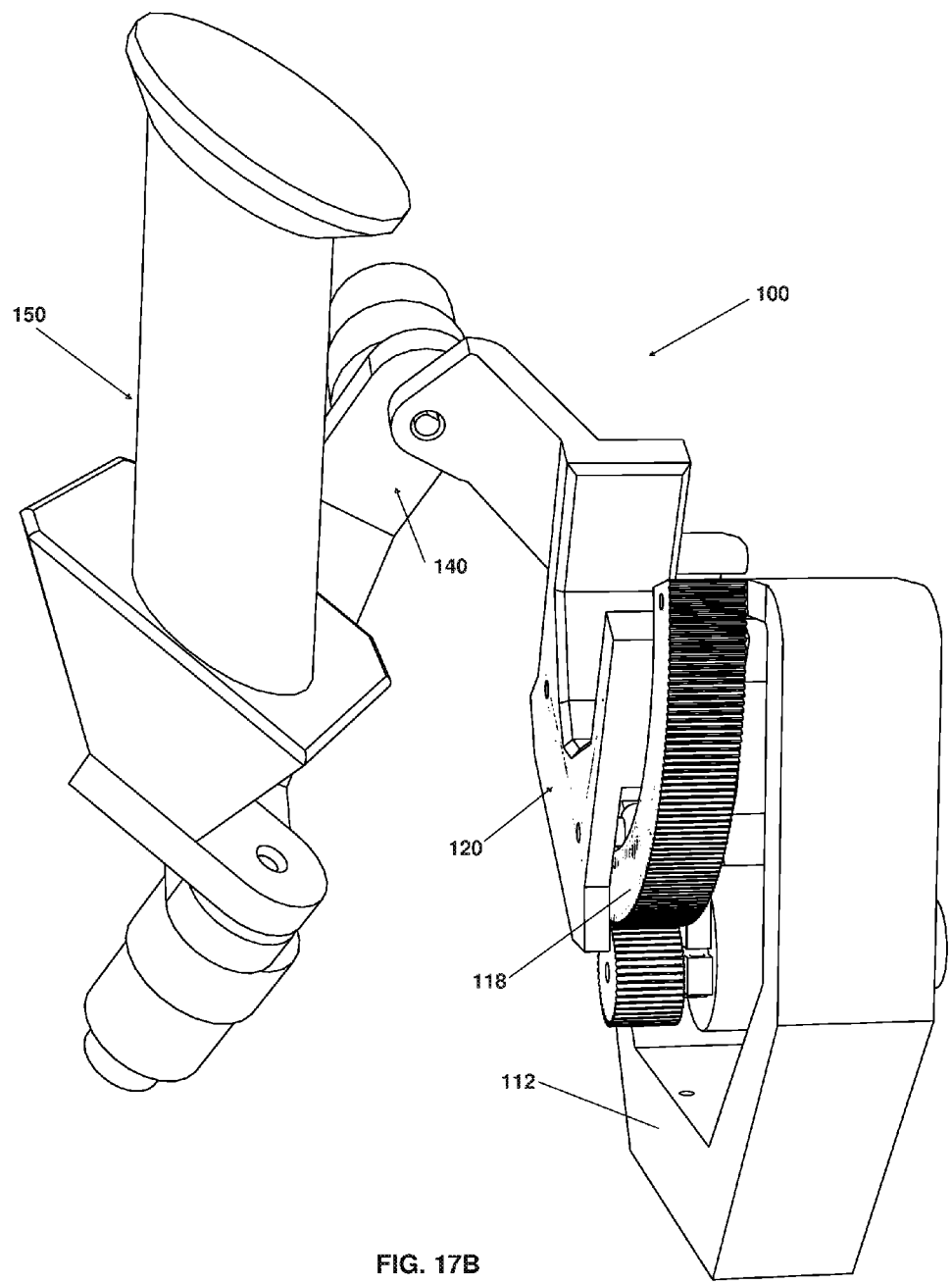
Figure 17C:
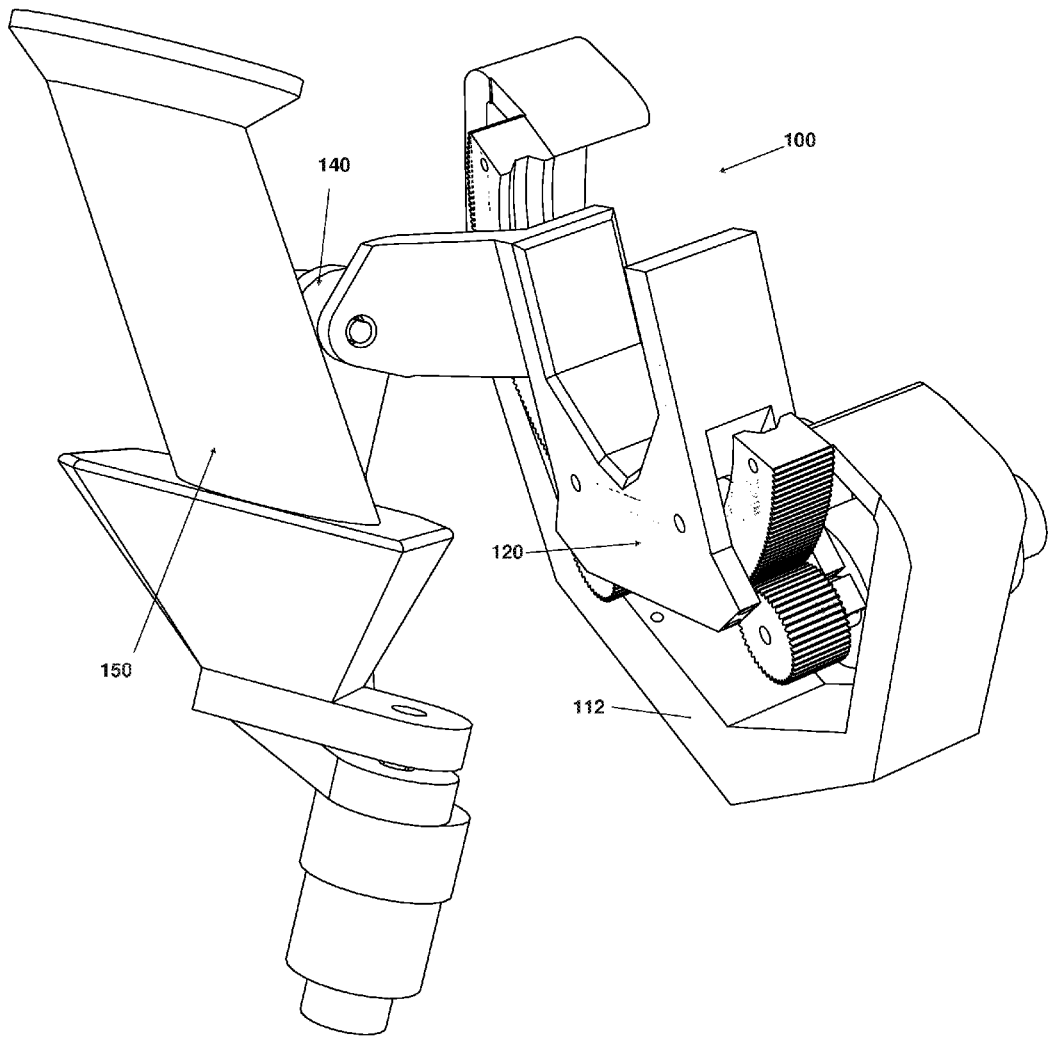

FIGS. 17A, 17B, and 17C show the controller 100 of FIGS. 10A and 10B rotated around the yaw, pitch, and roll axes, in three different extent and direction combinations. Here, each element which can be rotated with respect to another, in an embodiment of the disclosed technology, is so rotated.

Rotation of the R link (flange 120 with respect to the mounting base 112) can be used to steer a vehicle left or right. Rotation of the P link (second flange 140 with respect to first flange 120) can be used for acceleration and deceleration of a vehicle. Rotation of the Y link (joystick 150 with respect to second flange 140) can be used for fine control of steering, such that, per degree of rotation, steering has less magnitude for rotation of the Y link compared to rotation of the R link. In some embodiments, the assignment of the Y-link and the R-link may be reversed, such that rotation of the Y-link is used to steer the vehicle left or right and rotation of the R-link is used for fine control of steering.

Figure 18:
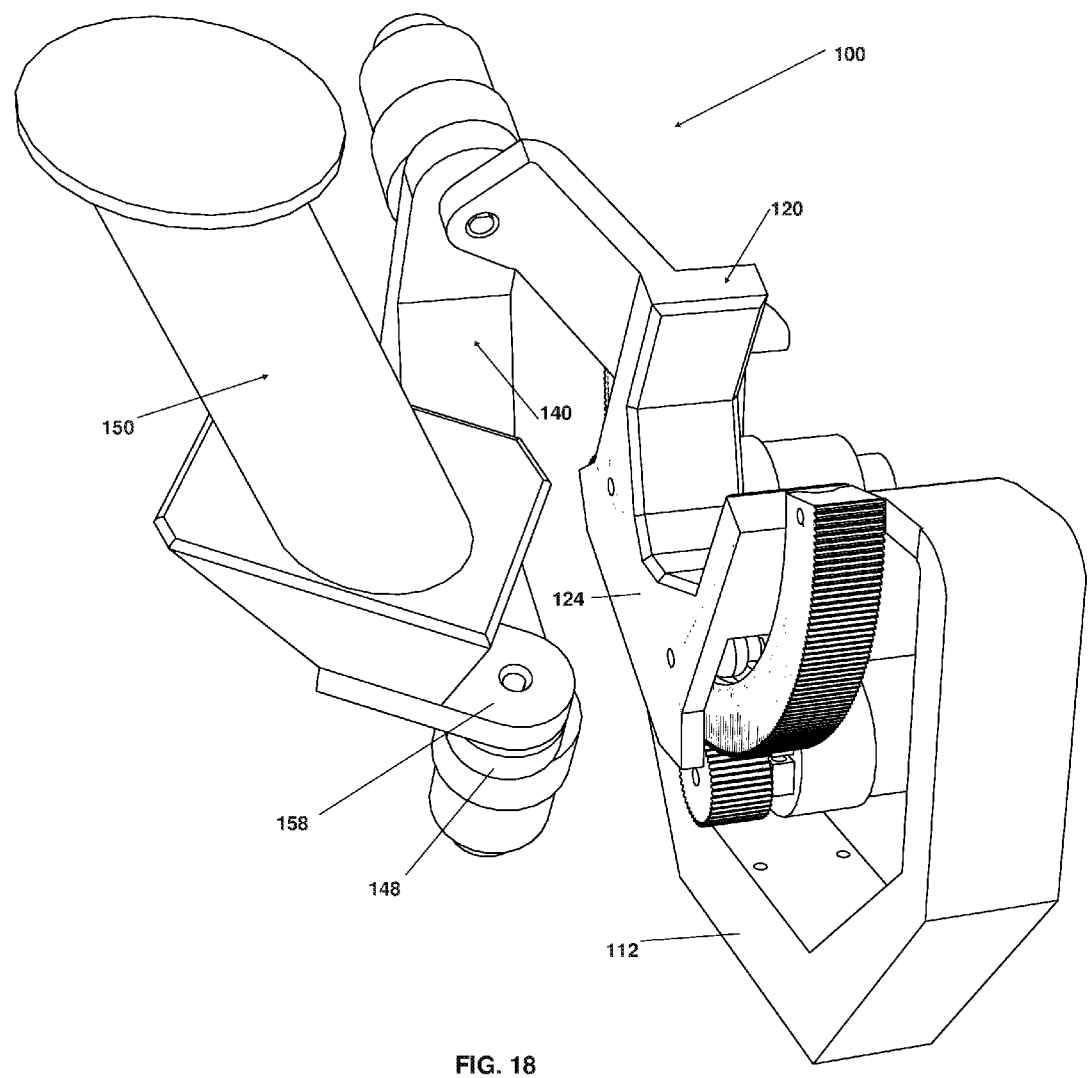
FIG. 18 shows the controller of FIGS. 10A and 10B rotated around the yaw and roll axes.

FIG. 18 shows the controller 100 of FIGS. 10A and 10B with rotations around the yaw and roll axes. Here, the pitch remains constant, compared to FIGS. 10A and 10B (a side surface of second flange 140 remains parallel to front surface 124 of first flange 120). However, the yaw is changed (the angle between linking portion 158 of joystick 150 and the second flange 140 is acute, and has changes relative to right angle shown in FIG. 10A) as well as the roll, which has changed similarly to the change shown in FIG. 12.

In some embodiments, the rotation of the R link is used at lower speeds for coarse steering maneuvers, such as turning and parking, rotation of the Y link is used for fine steering adjustment for higher speed maneuvers, such as highway lane keeping or lane changes, or rotation of both may occur simultaneously.

Controller 100 illustrated in FIGS. 10A to 18 is a controller suited for right handed use. An equivalent controller suited for left handed use would be a mirror image of the illustrated controller, and is considered within the scope of the present invention.

Although the embodiments disclosed herein show the links ordered such that the middle link is the P-link, any ordering of the links is considered to be within the scope of this application, provided that all three (R, P, and Y) are included. As such, the present invention relates also to controllers in which the link order is RYP, PRY, PYR, and YRP.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A controller, comprising:
    a fixed position mounting base;

a first flange having a first end and second end at right angles to each other, said first end of said first flange rotatably connected to said fixed position mounting base;

a second flange having a first end and second end at right angles to each other, said first end of said second flange rotatably connected to said second end of said first flange; and a generally U-shaped third flange having a mid-region and first and second ends, said mid-region rotatably connected to second end of said second flange, and a joystick formed between said first and second ends of said third flange;

wherein rotation of said joystick with respect to said second flange causes a vehicle to turn left or right, and wherein rotation of said first flange with respect to said fixed position mounting base causes said vehicle to turn left or right to a lesser degree per degree of rotation than said rotation of said joystick with respect to said second flange.

2. The controller of claim 1, wherein a yaw sensor measures rotation of said first flange with respect to said fixed position mounting base.

3. The controller of claim 2, wherein a pitch sensor measures rotation of said second flange with respect to said first flange.

4. The controller of claim 3, wherein a roll sensor measures rotation of said third flange and said joystick with respect to said second flange.

5. The controller of claim 4, wherein said first and second ends of said third flange are substantially perpendicular to said second end of said second flange, and said second end of said first flange and said first end of said second flange are at right angles to each other.

6. The controller of claim 1, wherein:
at least one of said first flange, said second flange, said third flange, and said mounting base includes a hollow; and
at least one linkage connecting two of said first flange, said second flange, said third flange, and said mounting base, or at least one motor for generating torque and at least one sensor for measuring degree of rotation, is disposed in said hollow.

7. A controller comprising:
a fixed position mounting base;
a first flange having a first end and second end at right angles to each other, said first end of said first flange rotatably connected to said fixed position mounting base;
a second flange having a first end and second end at right angles to each other, said first end of said second flange rotatably connected to said second end of said first flange; and
a generally U-shaped third flange having a mid-region and first and second ends, said mid-region rotatably connected to second end of said second flange, and a joystick formed between said first and second ends of said third flange,
wherein rotation of said first flange with respect to said fixed position mounting base causes a vehicle to turn left or right, and wherein rotation of said joystick with respect to said second flange causes said vehicle to turn left or right to a lesser degree per degree of rotation than said rotation of said first flange with respect to said fixed position mounting base.

8. The controller of claim 7, wherein rotation of said second flange with respect to said first flange causes said vehicle to accelerate or decelerate.

9. A controller, comprising:
a fixed position mounting base;
a substantially U-shaped first flange having a mid-region and having a flange extension extending from one end thereof, said mid-region rotatably connected to said fixed position mounting base;
a second flange having first and second ends, said first end of second flange and said flange extension of said first flange being rotatably connected; and
a joystick rotatably connected to said second end of said second flange;
wherein rotation of said joystick with respect to said second flange causes a vehicle to turn left or right, and wherein rotation of said first flange with respect to said fixed position mounting base causes said vehicle to turn left or right to a lesser degree per degree of rotation than said rotation of said joystick with respect to said second flange.

10. The controller of claim 9, wherein said mid-region of said first flange is rotatably connected to said fixed position mounting base via a curved rack and pinion mechanism.

11. The controller of claim 10, wherein a roll sensor measures rotation of said first flange with respect to said fixed position mounting base.

12. The controller of claim 11, wherein a pitch sensor measures rotation of said second flange with respect to said first flange.

13. The controller of claim 12, wherein a yaw sensor measures rotation of said joystick with respect to said second flange.

14. A controller, comprising:
a fixed position mounting base;
a substantially U-shaped first flange having a mid-region and having a flange extension extending from one end thereof, said mid-region rotatably connected to said fixed position mounting base; and
a second flange having first and second ends, said first end of second flange and said flange extension of said first flange being rotatably connected;
a joystick rotatably connected to said second end of said second flange;
wherein rotation of said first flange with respect to said fixed position mounting base causes a vehicle to turn left or right, and wherein rotation of said joystick with respect to said second flange causes said vehicle to turn left or right to a lesser degree per degree of rotation than said rotation of said first flange with respect to said fixed position mounting base.

15. The controller of claim 14, wherein rotation of said second flange with respect to said first flange causes said vehicle to accelerate or decelerate.

* * * * *